United States Patent
del Pero et al.

(10) Patent No.: US 12,169,949 B2
(45) Date of Patent: Dec. 17, 2024

(54) CAMERA TO CAMERA CALIBRATION

(71) Applicant: Lyft, Inc., San Francisco, CA (US)

(72) Inventors: Luca del Pero, London (GB); Karim Tarek Mahmoud Elsayed Ahmed Shaban, London (GB)

(73) Assignee: Lyft, Inc., San Francisco, CA (US)

( * ) Notice: Subject to any disclaimer, the term of this patent is extended or adjusted under 35 U.S.C. 154(b) by 738 days.

(21) Appl. No.: 17/133,041

(22) Filed: Dec. 23, 2020

(65) Prior Publication Data
US 2022/0198714 A1 Jun. 23, 2022

(51) Int. Cl.
*G06T 7/80* (2017.01)
*B60R 1/23* (2022.01)
(Continued)

(52) U.S. Cl.
CPC .............. *G06T 7/85* (2017.01); *B60R 1/23* (2022.01); *G06T 7/73* (2017.01); *G06V 20/56* (2022.01);
(Continued)

(58) Field of Classification Search
CPC ...... G06V 20/56; G06V 20/58; G06V 10/255; G06V 10/147; G06T 7/55; G06T 2207/30248; G06T 7/85; G06T 7/593; G06T 7/97; G06T 7/285; G06T 2207/10021; G06T 2207/30244; G06T 7/80; G06T 7/30; G06T 7/70; G05D 1/0251; G05D 1/0253; G05D 1/0246;
(Continued)

(56) References Cited

U.S. PATENT DOCUMENTS

| | | | | |
|---|---|---|---|---|
| 10,298,910 B1* | 5/2019 | Kroeger | .................... | G06T 7/85 |
| 2015/0271483 A1* | 9/2015 | Sun | ....................... | G06T 3/4038 |
| | | | | 348/187 |

(Continued)

OTHER PUBLICATIONS

H. Liu et al., "Spatiotemporal LiDAR-IMU-Camera Calibration: A Targetless and IMU-Centric Approach Based on Continuous-time Batch Optimization," 2022 34th Chinese Control and Decision Conference (CCDC), Hefei, China, 2022, pp. 3535-3540, doi: 10.1109/CCDC55256.2022.10034283. (Year: 2022).*

*Primary Examiner* — Gandhi Thirugnanam
*Assistant Examiner* — Chelsea J Greene
(74) *Attorney, Agent, or Firm* — Lee Sullivan Shea & Smith LLP

(57) ABSTRACT

Examples disclosed herein involve a computing system configured to (i) obtain first image data captured by a first camera of a vehicle during a given period of operation of the vehicle, (ii) obtain second image data captured by a second camera of the vehicle during the given period of operation, (iii) based on the obtained first and second image data, determine (a) a candidate extrinsics transformation between the first camera and the second camera and (b) a candidate time offset between the first camera and the second camera, and (iv) based on (a) the candidate extrinsics transformation and (b) the candidate time offset, apply optimization to determine a combination of (a) an extrinsics transformation and (b) a time offset that minimizes a reprojection error in the first image data, where the reprojection error is defined based on a representation of at least one landmark that is included in both the first and second image data.

20 Claims, 17 Drawing Sheets

(51) Int. Cl.
  *G06T 7/73*    (2017.01)
  *G06V 20/56*   (2022.01)
  *H04W 4/46*    (2018.01)

(52) U.S. Cl.
  CPC ......... *H04W 4/46* (2018.02); *B60R 2300/105* (2013.01); *B60R 2300/402* (2013.01); *G06T 2207/30248* (2013.01)

(58) Field of Classification Search
  CPC .... G05D 1/0231; G05D 1/0094; H04N 23/90; H04N 13/239; B60R 2300/00; B60R 1/00; B60R 2300/402; B60R 2300/105; B60W 2050/0083; G01C 11/06
  See application file for complete search history.

(56) References Cited

U.S. PATENT DOCUMENTS

2015/0341629 A1\* 11/2015 Zeng .................... H04N 17/002
                                                   348/187
2018/0232907 A1\*  8/2018 Sung ................... H04N 17/002

\* cited by examiner

CAMERA TO CAMERA CALIBRATION

BACKGROUND

Vehicles are increasingly being equipped with sensors that capture sensor data while such vehicles are operating in the real world, and this captured sensor data may then be used for many different purposes, examples of which may include building an understanding of how vehicles and/or other types of agents (e.g., pedestrians, bicyclists, etc.) tend to behave within the real world and/or creating maps that are representative of the real world. The sensor data that is captured by these sensor-equipped vehicles may take any of various forms, examples of which include Global Positioning System (GPS) data, Inertial Measurement Unit (IMU) data, camera image data, Light Detection and Ranging (LiDAR) data, Radio Detection And Ranging (RADAR) data, and/or Sound Navigation and Ranging (SONAR) data, among various other possibilities.

SUMMARY

In one aspect, the disclosed technology may take the form of a method that involves (i) obtaining first image data captured by a first camera of a vehicle during a given period of operation of the vehicle, (ii) obtaining second image data captured by a second camera of the vehicle during the given period of operation of the vehicle, (iii) based on the obtained first and second image data, determining (a) a candidate extrinsics transformation between the first camera and the second camera and (b) a candidate time offset between the first camera and the second camera, and (iv) based on (a) the candidate extrinsics transformation and (b) the candidate time offset, applying optimization to determine a combination of (a) an extrinsics transformation and (b) a time offset that minimizes a reprojection error in the first image data, wherein the reprojection error is defined based on a representation of at least one landmark that is included in both the first and second image data.

In some example embodiments, the method may involve, (i) for each image in the first image data, identifying at least one corresponding image in the second image data that includes the representation of the at least one landmark that is also included in the first image data, (ii) determining a respective pose for the second camera at each time that the at least one corresponding image was captured, and (iii) for each image in the first image data, determining a candidate pose for the first camera by applying (a) the candidate extrinsics transformation and (b) the candidate time offset to one of the determined poses of the second camera.

Further, in example embodiments, the method may involve, (i) based on the representation of the at least one landmark in the identified at least one corresponding image, determining a reprojected representation of the at least one landmark in each image in the first image data, and (ii) for each image in the first image data, determining an individual reprojection error between the reprojected representation of the at least one landmark and the representation of the at least one landmark in the first image, wherein the reprojection error in the first image data comprises an aggregation of the individual reprojection errors.

Further yet, in example embodiments, identifying the at least one corresponding image in the second image data may involve identifying a first corresponding image that was captured earlier in time than the image in the first image data and identifying a second corresponding image that was captured later in time than the image in the first image data.

Still further, in some example embodiments, the method may involve determining the candidate time offset between the first camera and the second camera by applying linear interpolation between (i) the time that the first corresponding image was captured and (ii) the time that the second corresponding image was captured.

Still further, in some example embodiments, applying the optimization to determine the combination of (i) the extrinsics transformation and (ii) the time offset that minimizes a reprojection error in the first image data may involve determining (i) an updated candidate extrinsics transformation and (ii) and updated candidate time offset that reduces the reprojection error in the first image data.

Still further, in some example embodiments, the method may involve (i) identifying, within the obtained first image data, a first set of images captured by the first camera during a given time period when a velocity of the vehicle was zero, and (ii) identifying, within the obtained second image data, a second set of images captured by the second camera during the given time period, wherein applying optimization to determine the combination of (i) the extrinsics transformation and (ii) the time offset that minimizes the reprojection error in the first image data comprises applying optimization to determine the extrinsics transformation using the first set of images and the second set of images.

Still further, in some example embodiments, applying optimization to determine the combination of (i) the extrinsics transformation and (ii) the time offset that minimizes the reprojection error in the first image data may involve applying optimization to determine the time offset using a fixed extrinsics transformation.

In another aspect, the disclosed technology may take the form of a computing system comprising at least one processor, a non-transitory computer-readable medium, and program instructions stored on the non-transitory computer-readable medium that are executable by the at least one processor such that the computing system is configured to carry out the functions of the aforementioned method.

In yet another aspect, the disclosed technology may take the form of a non-transitory computer-readable medium comprising program instructions stored thereon that are executable to cause a computing system to carry out the functions of the aforementioned method.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

DETAILED DESCRIPTION

Figure 1A:
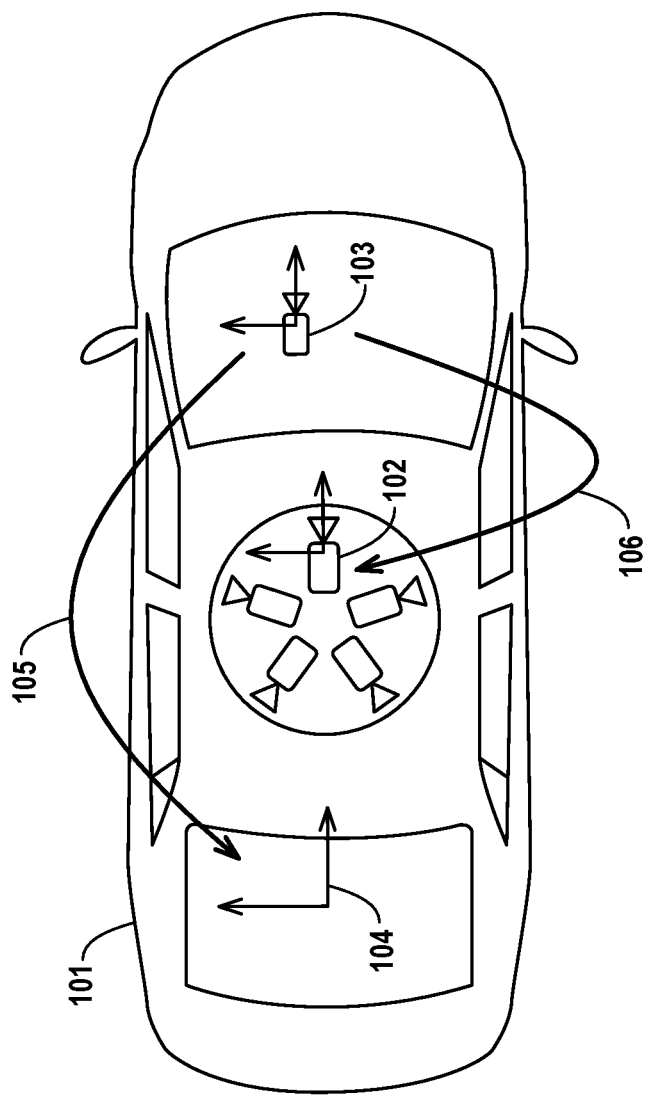
FIG. 1A is a diagram that illustrates an example sensor-equipped vehicle that includes multiple cameras.

As noted above, vehicles are increasingly being equipped with sensors that capture sensor data while such vehicles are operating in the real world, such as Global Positioning System (GPS) data, Inertial Measurement Unit (IMU) data, camera image data, Light Detection and Ranging (LiDAR) data, Radio Detection And Ranging (RADAR) data, and/or Sound Navigation and Ranging (SONAR) data, among various other possibilities, and this captured sensor data may then be used for many different purposes. For instance, sensor data that is captured by sensor-equipped vehicles may be used to create maps that are representative of the real world, build an understanding of how vehicles and/or other types of agents (e.g., pedestrians, bicyclists, etc.) tend to behave within the real world, and/or facilitate autonomous or semi-autonomous driving of the sensor-equipped vehicle (e.g., by training machine learning models used to detect agents and/or evaluate vehicle performance).

One important aspect of a sensor-equipped vehicle's operation is the calibration of each sensor that is included as part of the vehicle's on-board sensor system, which may directly impact the accuracy and thus the usability of sensor data captured by the sensor(s). For instance, sensor data captured by an accurately calibrated sensor may be used to reliably estimate the location of other objects (e.g., agents and non-agents) in the vehicle's surrounding environment and/or localize the vehicle within a map for a given area. In addition, sensor data captured by an accurately calibrated sensor may be combined with or otherwise used in conjunction with sensor data captured by other sensors. On the other hand, a less accurate sensor calibration may yield sensor data that is less accurate and therefore less usable for the various purposes discussed above, among others.

In this regard, the calibration of a given sensor may generally involve the estimation of three types of information. The first is the sensor's internal characteristics, sometimes referred to as the sensor's "intrinsics," which will typically be known based on the hardware of the specific sensor. For example, based on its make and model, a given camera may have known intrinsics such as a focal length, skew, distortion, and image center, among other possibilities. Accordingly, this information may provide the basis for deriving, based on the image data captured by the camera, the location of objects with respect to the camera.

The second type of information on which the calibration of a given sensor is based is the on-vehicle position and orientation of the sensor with respect to an external reference frame, such as a vehicle reference frame. This type of information is sometimes referred to as the sensor's "extrinsics." For example, one possible vehicle reference frame may have an origin that is located at the rear axle of the vehicle. In this respect, a given sensor that is mounted at a different location on the vehicle (e.g., on the vehicle's roof, on the vehicle's dashboard, etc.) will have associated extrinsics that indicate one or both of a translation and a rotation in a six-axis coordinate frame with respect to the vehicle reference frame (e.g., the vehicle's rear axle). Accordingly, this information may provide the basis to determine the spatial alignment of the sensor data captured by the given sensor with respect to the vehicle reference frame. Further, the extrinsics may be determined for each sensor on the vehicle, such that the sensor data from multiple different sensors having different on-vehicle positions and orientations may be represented according to the same common vehicle coordinate frame.

In addition, it will be recognized that once the extrinsics of each sensor is accurately expressed with respect to the vehicle's reference frame, the poses of any two sensors may be compared to each other to determine their relative extrinsics, which may represent the on-vehicle position and orientation of one sensor with respect to the other.

The third type of information on which the calibration of a given sensor is based is time offset information, which may provide an indication of how the timing of captured sensor data (e.g., timestamps for each frame of sensor data) from one sensor relates to another. In this regard, some vehicle sensors may generate timing information based on their own individual clocks, which may not be synchronized with each other. On the other hand, some vehicle sensors (e.g., the various LiDAR unit(s), camera(s), and telematics sensor(s) of a LiDAR-based sensor system) may operate according to the same clock such that the sensor data captured by each sensor is synchronized and there is no time offset between them.

Turning to FIG. 1A, an example vehicle 101 is shown that is equipped with some of the different types of sensor systems noted above. For instance, the vehicle 101 includes a LiDAR-based sensor system of the type generally found on vehicles that are designed for autonomous or semi-autonomous driving and/or high-quality sensor data collection (e.g., for purposes of map generation). Such a LiDAR-based sensor system may include one or more LiDAR units, a camera array including a set of cameras 102, telematics sensors (e.g., a GPS, an IMU, etc.), and the like. In FIG. 1A, various sensors of the LiDAR-based sensor system are incorporated into a roof-mounted sensor rig, although other configurations are also possible.

Further, the vehicle 101 also includes a separate, camera-based sensor system that includes at least one camera 103, as well as telematics sensors. In this regard, the camera 103 may be a dashboard-mounted camera (e.g., a monocular and/or stereo camera) that is embodied in the form of a smartphone or the like.

As shown in FIG. 1A, the camera 102 has a particular on-vehicle position and orientation with respect to a coordinate frame 104 of the vehicle 101, which is shown for reference at the rear axle of the vehicle 101. For example, the extrinsics of camera 102 may be represented as a translation (e.g., in the forward and vertical directions) and a rotation (e.g., about the pitch axis) with respect to the vehicle's coordinate frame 104. Similarly, the camera 103 may have an on-vehicle position and orientation that may be represented as a translation (e.g., translations in the forward, lateral, and vertical directions) and a rotation (e.g., about the yaw and pitch axes) with respect to the vehicle's coordinate frame 104. In this regard, it will be appreciated with reference to FIG. 1A that every sensor of the vehicle 101 will have an on-vehicle position and orientation that may be represented by a different set of extrinsics with respect to the vehicle's coordinate frame 104 based on where the sensor is affixed to the vehicle 101.

For the camera 102 and other sensors of a LiDAR-based sensor system, which are generally positioned at a fixed location on the vehicle 101, current methods for determining a calibration typically involve locating the vehicle 101 within a structured environment that includes specialized calibration equipment. This is sometimes referred to as a "factory calibration," and provides an accurate estimate of the extrinsics of the sensors in LiDAR-based sensor system with respect to the vehicle's coordinate frame 104. However, the extrinsics of the camera 103 with respect to the vehicle's coordinate frame 104, which is shown by way of example in FIG. 1A as an arrow 105, may not be estimated during a factory calibration. For example, the camera 103 may not be present in the vehicle 101 when the initial, factory calibration is undertaken. Moreover, even if the camera 103 were present during the factory calibration, the camera 103 may change locations within the vehicle 101 (e.g., every time a smartphone including camera 103 is removed/replaced) such that a factory calibration might only be valid for a limited time. For the same reasons, the relative extrinsics between the camera 103 and the camera 102 (e.g., a translation and rotation between the two cameras), shown by way of example in FIG. 1A as an arrow 106, may not be estimated during a factory calibration.

Figure 1B:
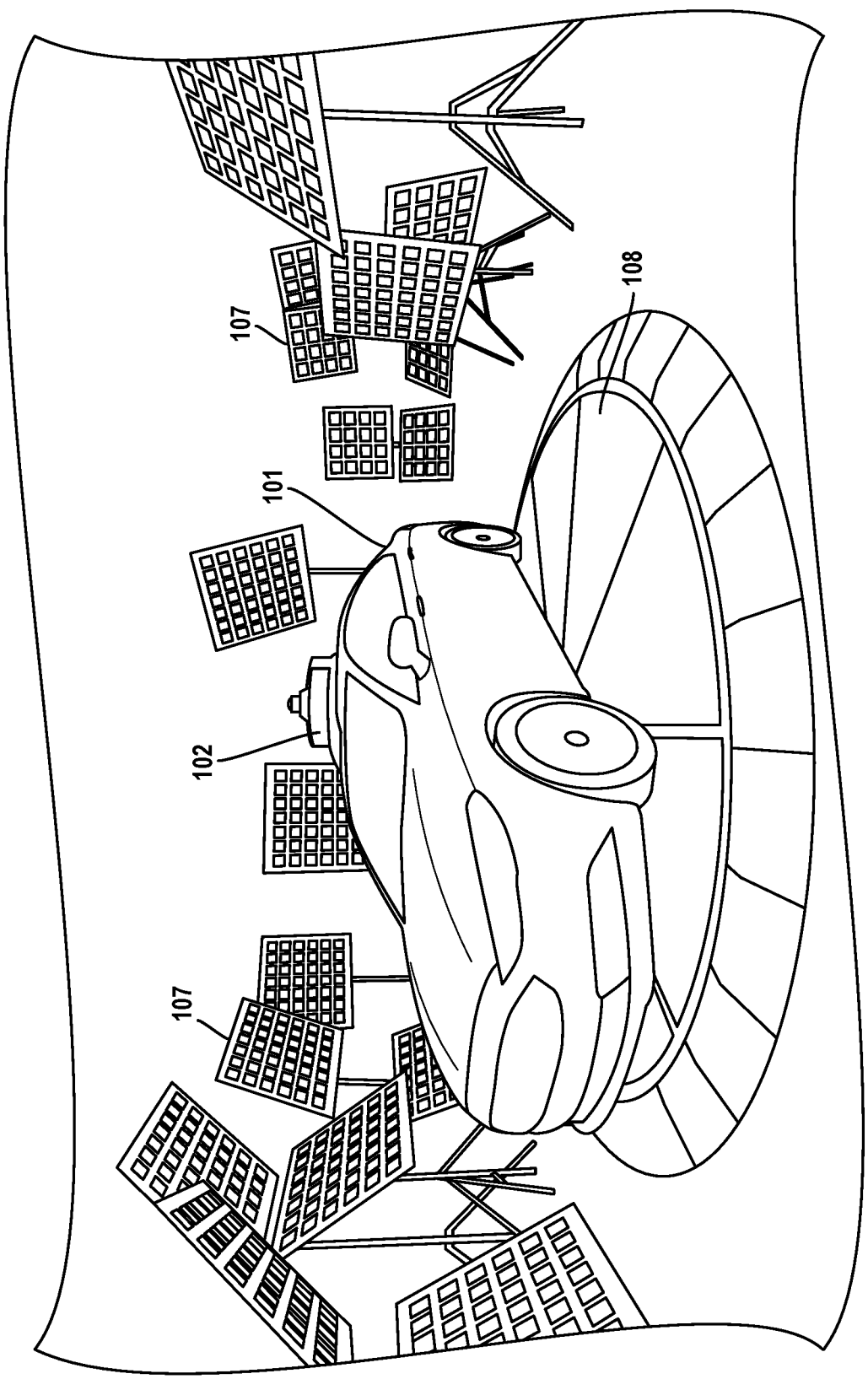
FIG. 1B is a diagram that illustrates an example of a vehicle undergoing factory calibration of sensors in a LiDAR-based sensor system.

One example of a factory calibration can be seen in FIG. 1B, which depicts the vehicle 101 of FIG. 1A—but without camera 103—undergoing a calibration of one or more sensors in the type of structured environment discussed above. For instance, the vehicle 101 may be surrounded by a controlled set of unobscured reference objects at various positions and orientations with respect to the vehicle 101, which are shown in FIG. 1B as a series of checkerboard targets 107. Further, the vehicle 101 may be positioned on a vehicle turntable 108 or similar equipment that is adapted to move the vehicle 101 in a controlled way. During the calibration process, each of the sensors (e.g., one or more LiDAR units, one or more cameras 102, etc.) of vehicle 101 may capture a relatively robust set of high-confidence sensor data that is indicative of the checkerboard targets 107 at various points in time as the vehicle 101 is rotated on the vehicle turntable 108. This sensor data may then be utilized by one or more optimization algorithms to estimate the extrinsics of each sensor in LiDAR-based sensor system with respect to the vehicle's coordinate frame 104 with a relatively high degree of accuracy.

Once the camera 103 is mounted within the vehicle 101, it may be possible to determine a calibration of the camera 103 by determining a calibration between the camera 103 and an already-calibration sensor, such as camera 102. However, there are various challenges associated with determining an accurate calibration between the camera 103 and camera 102. A first challenge is that current methods for determining the extrinsics of the camera 103 with respect to camera 102 are not as accurate as the factory calibration techniques noted above. For instance, taking physical measurements between the camera 103 and camera 102 to determine their relative extrinsics (e.g., using a tape measure or other measuring device) can be time consuming and subject to inconsistency between measurements. Further, it generally does not provide the desired level of accuracy.

Another challenge associated with determining a calibration between the camera 103 and the camera 102 is the difficulty of determining time offset information for camera 103 in relation to camera 102. In this regard, the camera 102 and each of the other sensors of the LiDAR-based sensor system (e.g., LiDAR unit(s), camera(s), telematics sensor(s)) may operate according to the same clock, such that the captured LiDAR data, image data, and telematics data are all temporally aligned. On the other hand, the camera 103 may operate according to its own, separate clock, and may capture image data that is unsynchronized with the image data of camera 102. For example, even if the camera 103 and the camera 102 were to each capture a frame of image data having identical timestamps, the two timestamps are nonetheless generated based on different, unsynchronized clocks. Thus, the two frames of image data may not have been captured at the same time.

As a result of these challenges, the image data captured by the camera 103 may be difficult to accurately align, both spatially and temporally, with the sensor data captured by the other sensors of vehicle 101. In this regard, determining an accurate spatial and temporal calibration between two different cameras installed at a vehicle may enable various use cases, examples of which may include determining a calibration between two different sensor systems installed at a vehicle (which may facilitate tasks such training machine learning models, evaluating the accuracy of trajectories captured by the sensor systems, and the like), and/or fusing the sensor data from the different sensors together into a representation of the real-world environment. Additional use cases may include monitoring how an extrinsics calibration between two cameras installed at a vehicle compares to a previously-determined extrinsics calibration between the two cameras, among other possibilities.

Figure 1C:
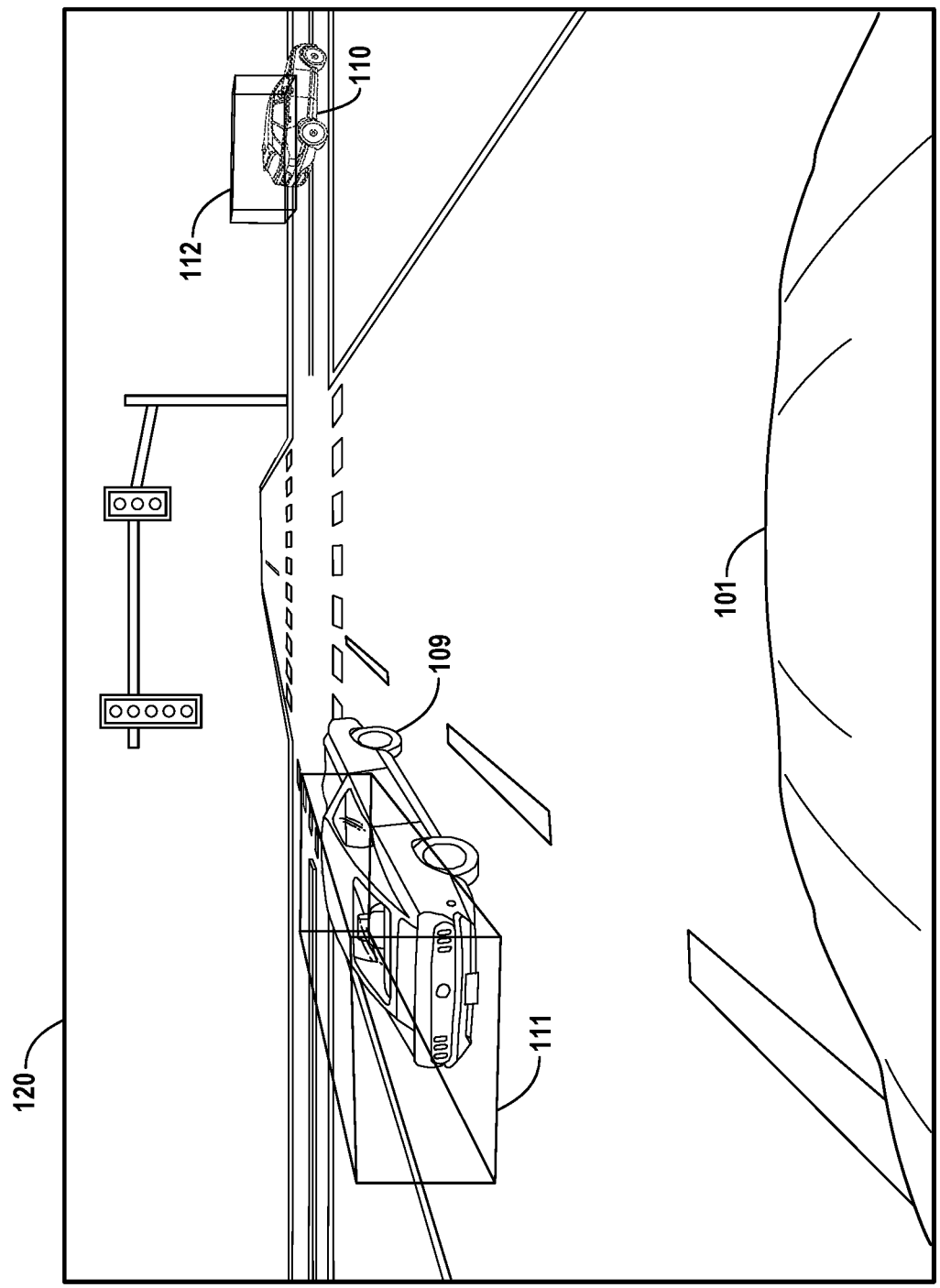
FIG. 1C is a diagram that illustrates an example of projecting bounding boxes derived from a vehicle's captured LiDAR data into an image captured by a separately-mounted camera on the vehicle.

FIG. 1C illustrates on example reflecting the challenges of aligning the image data captured by camera 103 with the vehicle's other captured sensor data using current methods. FIG. 1C depicts an example frame 120 of image data captured by the camera 103 of vehicle 101, which shows a representation of a scene that includes first vehicle 109 and a second vehicle 110. Separately, the LiDAR based sensor system of vehicle 101 may have captured sensor data of the same scene, and LiDAR-based bounding boxes for the two vehicles in the scene may have been derived. However, as can be seen in FIG. 1C, projecting the LiDAR-based bounding boxes 111 and 112 into the frame 120 of image data based on an inaccurate calibration between the camera 103 and the LiDAR-based sensor system (e.g., spatial and/or temporal inaccuracies) causes the bounding boxes to be misaligned with the vehicle 109 and 110. Accordingly, it may not be possible to reliably utilize the image data captured by camera 103 in conjunction with the vehicle's other sensor data for the various purposes noted above.

For this reason, it would be beneficial to be able to determine a spatial and temporal calibration between two cameras installed on a vehicle based on data captured by the cameras while the vehicle was operating in a real-world environment. However, current approaches do not provide an efficient way to accomplish this.

In view of these and other shortcomings associated with existing approaches for calibrating a camera mounted on a vehicle, disclosed herein are new calibration techniques for estimating the extrinsics and the time offset between two different cameras mounted on a vehicle using timestamped image data captured by the two cameras while the vehicle is operating in a real-world environment. In some instances, the extrinsics and time offset between the cameras may be determined separately as part of a multi-stage calibration between the cameras. In other instances, the extrinsics and time offset may be determined as part of a combined optimization procedure.

In this regard, it should be understood that, for purposes of discussion herein, references to determining a calibration "between" two cameras may refer to determining the relative extrinsics and/or the relative time offset information between the two cameras, and not necessarily the extrinsics of either camera with respect to a vehicle reference frame or a common vehicle time scale. Rather, determining a calibration between the two cameras may provide a basis to spatially and/or temporally align the image data captured by the first camera with the image data captured by the second camera.

One example of the disclosed framework for determining a calibration between two cameras will now be generally described with reference to FIG. 2. At a high level, the framework shown in FIG. 2 may begin with the collection of respective image data by a first camera 202 and a second camera 203 that are each mounted to vehicle 201 with a different on-vehicle position and orientation. In this regard, the vehicle 201 may be similar to the vehicle 101 discussed above. For instance, the first camera 202 may be one camera in an array of cameras that operate as part of a LiDAR-based sensor system that is situated on the roof of vehicle 201, and may have been previously calibrated in the type of structured environment shown in FIG. 1B. Further, the second camera 203 may form part of a separate camera-based sensor system, such as a stereo camera or a monocular camera (e.g., a smartphone) that is mounted on the dashboard or windshield of the vehicle 201, among other possibilities. The second camera 203 may be uncalibrated with respect to both the vehicle 201 and the first camera 202.

Figure 2:
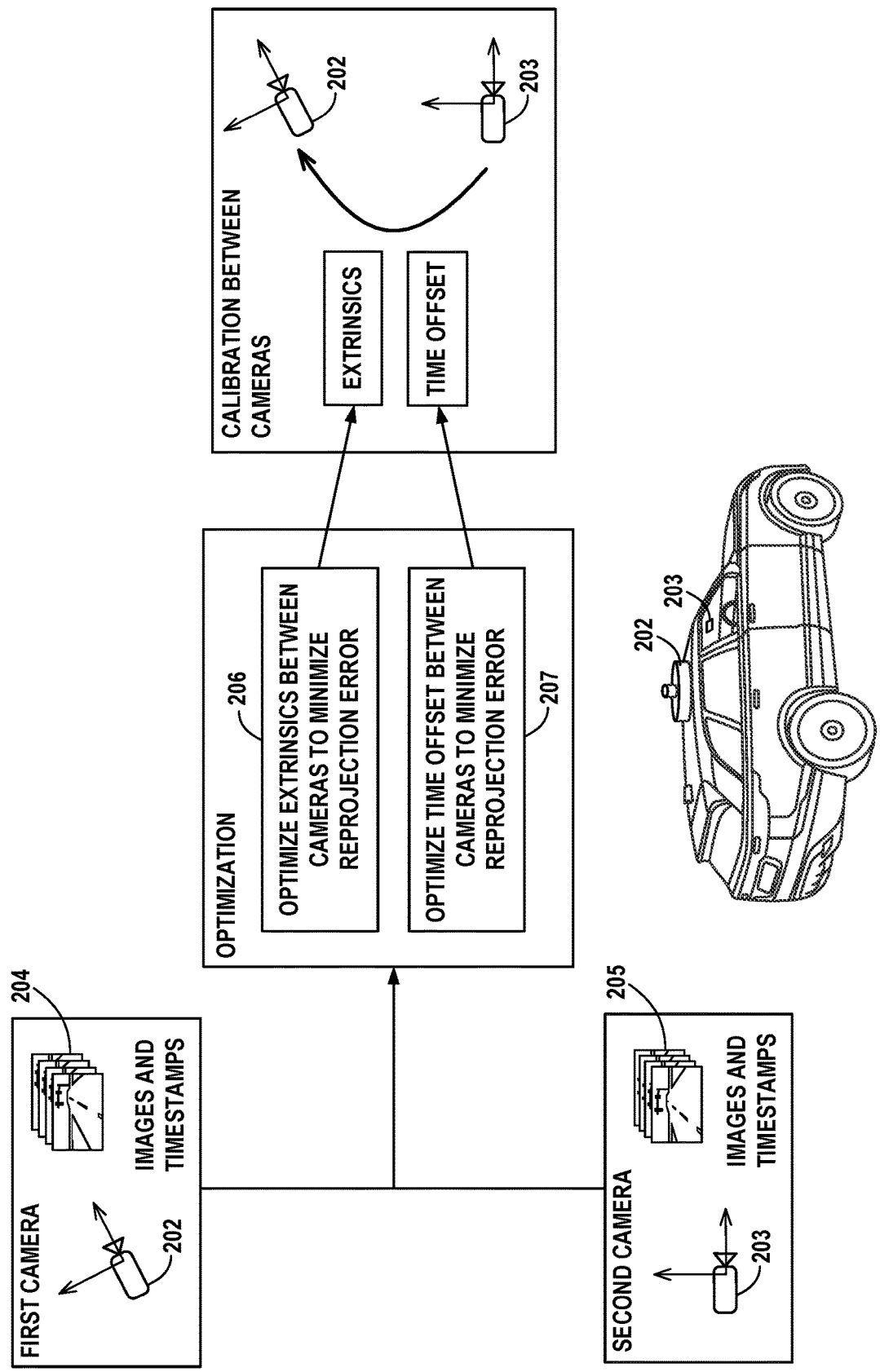
FIG. 2 is a diagram that illustrates one example of a framework that incorporates the disclosed technique of determining a calibration between two cameras.

As shown in FIG. 2, the first camera 202 may capture first image data 204 including a series of first images (e.g., image frames) that each have an associated timestamp generated by the LiDAR sensor system's clock indicating when each first image was captured. Similarly, the second camera 203 may capture second image data 205 including a series of second images that each have an associated timestamp generated by the camera-based sensor system's clock indicating when each second image was captured. In this regard, because the separate clocks of the two sensor systems are unsynchronized, the timestamps generated by the two clocks may not be equated with each other, as noted above.

Based on the captured first image data 204 and the captured second image data 205, the calibration techniques discussed herein may be utilized to determine two parameters—namely, an extrinsics transformation (e.g., a translation and a rotation) and a time offset between the first camera and the second camera. Conceptually, determining these two parameters may be modeled as two separate optimization processes, which will be described in further detail below.

At a high level, the calibration techniques discussed herein may involve a first process for estimating the extrinsics between the two cameras while assuming that the time offset between the two cameras is zero. For example, a first optimization algorithm, shown schematically in FIG. 2 as block 206, may be applied that iterates through different possibilities for the extrinsics transformation between the first and second cameras (i.e., "candidate" extrinsics transformations) while performing the following evaluation across each of various images captured by the first camera: (i) identify an image captured by the second camera representing a scene that at least partially overlaps with the scene represented by the image captured by the first camera (e.g., using GPS data corresponding to the images), (ii) identify an estimated pose of the second camera at the time the identified image was captured, (iii) apply a candidate extrinsics transformation to the estimated pose of the second camera to produce a candidate pose of the first camera, and (iv) for each of one or more three-dimensional landmarks that are represented within the identified image captured by the second camera, (a) use the measured position of the three-dimensional landmark within the second camera's image and the candidate pose of the first camera to reproject the three-dimensional landmark into the first camera's image and (b) determine the reprojection error between the projected position of the 3D landmark within the first camera's image and the measured position of the three-dimensional landmark within the first camera's image.

The first optimization algorithm 206 may then be used to determine an updated candidate extrinsics transformation that reduces the aggregated reprojection error, which may then be used in a subsequent iteration of the evaluation discussed above. The end result of this first optimization algorithm 206 is an identification of one particular extrinsics transformation that minimizes the reprojection error as evaluated across the various images captured by the first camera, which may then be used as the extrinsics between the first and second cameras. The first optimization algorithm 206 will be discussed in greater detail below with respect to FIGS. 3A-3C.

The calibration techniques discussed herein may also involve a second process for estimating the time offset between the two cameras while assuming that the extrinsics between the two cameras is zero. For example, a second optimization algorithm, shown schematically in FIG. 2 as block 207, may iterates through different possibilities for the time offset between the first and second cameras (i.e., "candidate" time offsets) while performing the following evaluation across each of various images captured by the first camera: (i) identify two images captured by the second camera that "bound" the image captured by the first camera (e.g., using GPS data corresponding to the images), (ii) identify estimated poses of the second camera at the two times that the two identified images were captured, (iii) use a linear motion model between the two estimated poses of the second camera and a candidate time offset to determine a candidate pose for the first camera that falls between the two estimated poses of the second camera, and (iv) for each of one or more three-dimensional landmarks represented within the two identified images captured by the second camera, (a) use the measured position of the three-dimensional landmark within one of the two identified images captured by the second camera and the candidate pose of the first camera to project the three-dimensional landmark into the first camera's image and (b) determine the reprojection error between the projected position of the three-dimensional landmark within the first camera's image and the measured position of the three-dimensional landmark within the first camera's image.

The first optimization algorithm 207 may then be used to determine an updated candidate time offset that reduces the aggregated reprojection error, which may then be used in a subsequent iteration of the evaluation discussed above. The end result of this second optimization algorithm is an identification of one particular time offset that minimizes the reprojection error as evaluated across the various images captured by the first camera, which may then be used as the time offset between the first and second cameras. The first optimization algorithm 207 will be discussed in greater detail below with respect to FIGS. 4A-4C.

In practice, the extrinsics and time offset between two cameras will both be non-zero and the determination of these two parameters will be dependent on one another. Accordingly, calibration techniques discussed herein may be used to jointly determine both the extrinsics between the two cameras and the time offset between the two cameras, examples of which will be discussed in greater detail below with respect to FIGS. 5A-5C.

Numerous other possibilities exist, some examples of which will be discussed in further detail below. Further, it should be understood that although the examples discussed herein generally refer to a first camera that is part of a LiDAR-based sensor system and a second camera that is separately mounted within the vehicle, the techniques disclosed herein may be applied to determine a calibration between any two vehicle-mounted cameras.

One example of utilizing the techniques discussed herein to determine an extrinsics transformation between a first camera and a second camera will now be described with reference to FIGS. 3A-3C, which illustrate an example pipeline of functions that may be carried out by a computing platform based on image data obtained by a vehicle 301. One possible example of such a computing platform and the structural components thereof is described below with reference to FIG. 9.

Figure 3A:
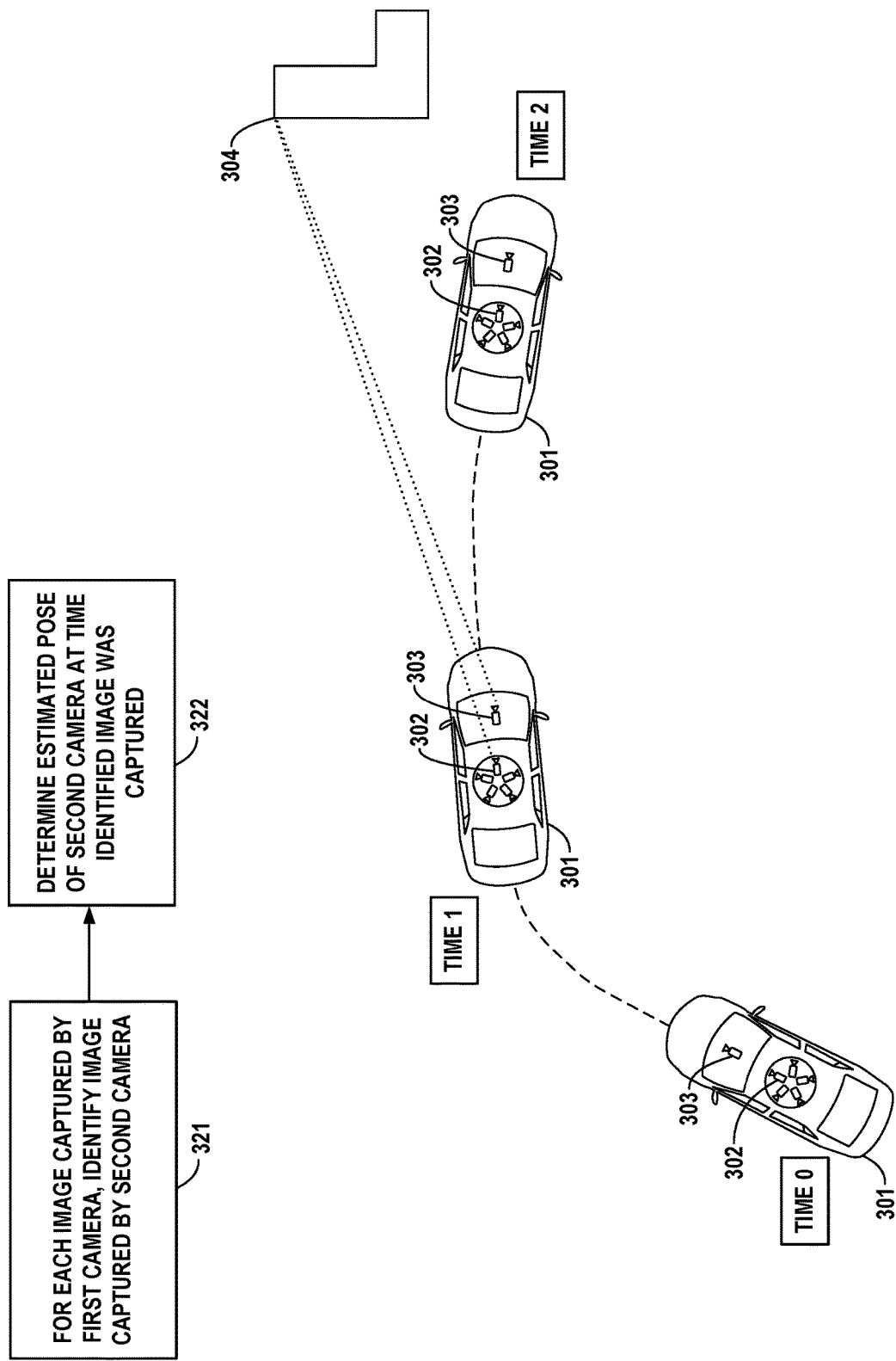
FIG. 3A is a diagram that illustrates one example of determining, for each respective image captured by a first camera, an image captured by a second camera and an estimated pose for the second camera.

As shown in FIG. 3A, the vehicle 301 may resemble the vehicle 201 discussed above, including a factory calibrated camera 302 as part of a LiDAR-based sensor system and a separately-mounted camera 303 for which a calibration is to be determined. The vehicle 301 is shown at various points in time along a trajectory, during which the first camera 302 and the second camera 303 may each capture respective image data. Further, at all points along the trajectory shown in FIG. 3A, a building 304 may be within the field of view of both cameras.

At block 321, the computing platform may identify, for each image captured by the first camera 302, a corresponding image captured by the second camera 303. As noted above, determining the extrinsics transformation between the first camera 302 and the second camera 303 may be modeled on the assumption that there is no time offset between the two cameras. Thus, each corresponding image captured by the second camera 303 might be identified by matching the timestamp of the image captured by the first camera 302. Thus, the image captured by the second camera 303 at timestamp "Time 0" may be identified as corresponding to the image captured by the first camera 302 at timestamp "Time 0," and so on. Other ways of identifying the corresponding images captured by the second camera are also possible, including utilizing GPS data associated with the respective image data to identify images captured by the second camera 303 that are of close proximity to the images captured by the first camera 302. Other possibilities also exist.

At block 322, the computing platform may determine, for each identified image captured by the second camera 303, an estimated pose for the second camera 303 at the time the identified image was captured. As discussed above, the computing platform may utilize one or more map generation techniques, such as Structure from Motion (SfM), to generate a visual map from the image data captured by the second camera 303, which may provide a reference frame for representing the pose of the second camera 303. The visual map may include three-dimensional representations of the building 304 and other landmarks within the field of view of the second camera 303, and the determined pose of the second camera 303 may be represented in relation to these landmarks. For instance, for the image captured by the first camera 302 at Time 1, a corresponding image captured by the second camera 303 at Time 1 may be identified, and a pose for the second camera at Time 1 may be determined that includes a representation of the position and orientation of building 304 in relation to the second camera 303, as shown in FIG. 3A. Similar steps may be carried out at each of Time 0 and Time 2.

Figure 3B:
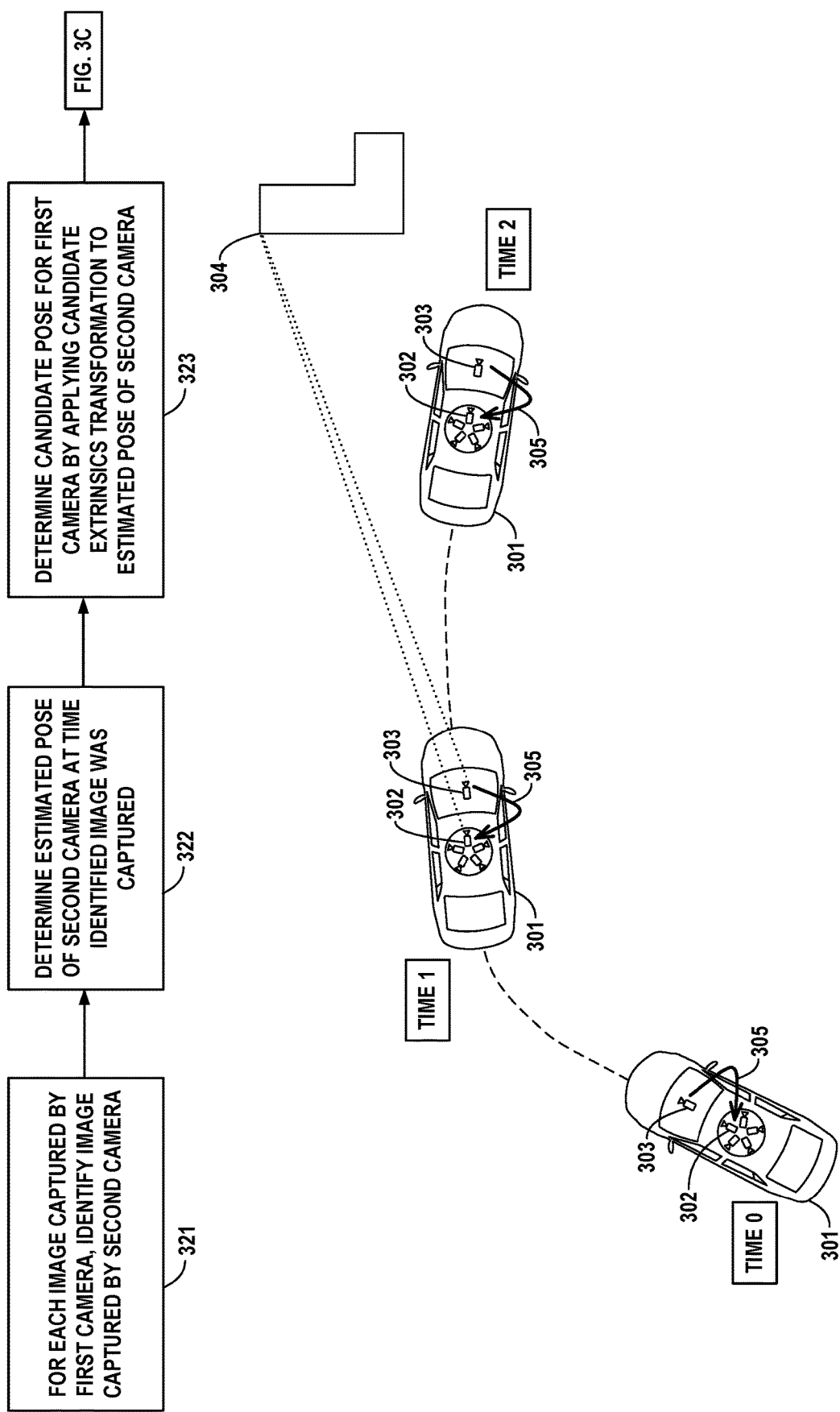
FIG. 3B is a diagram that illustrates one example of determining a candidate pose for the first camera of FIG. 3A based on a candidate extrinsics transformation between the first and second cameras.

Referring now to FIG. 3B, at block 323, the computing platform may determine a candidate pose for the first camera 302 by applying a candidate extrinsics transformation to each estimated pose of the second camera 303. The candidate extrinsics transformation is shown by way of example as the arrow 305 and may be initially determined in various ways. As one example, the computing platform may utilize one or more map generation techniques, such as Structure from Motion (SfM), to generate an additional visual map from the image data captured by the first camera 302, which may include a pose for the first camera 302 and corresponding positions and orientations of landmarks, such as building 304, with respect to the first camera 302. In this regard, although neither visual map contains information regarding the location of the other camera, both maps contain information about many of the same three-dimensional landmarks. Accordingly, an initial candidate extrinsics transformation between the first and second cameras may be determined by comparing their respective poses in relation to a common landmark, such as the corner of building 304, as shown in FIG. 3B at Time 1.

Because the initial candidate extrinsics transformation is only based on comparing two frames of image data at a single timestamp, it may not accurately reflect the extrinsics transformation across every pair of frames. Thus, the initial candidate extrinsics transformation may be applied to each determined pose for the second camera 303 during a given period of operation (e.g., a period of ten seconds). In this way, the computing platform may determine, for each image captured by the first camera 302, a candidate pose for the first camera 302 within the visual map of the second camera 303. This, in turn, provides the basis for the computing platform, at block 324, to reproject one or more landmarks that are common to the first and second camera images, such as the building 304, into the first camera image, which is illustrated in FIG. 3C.

Figure 3C:
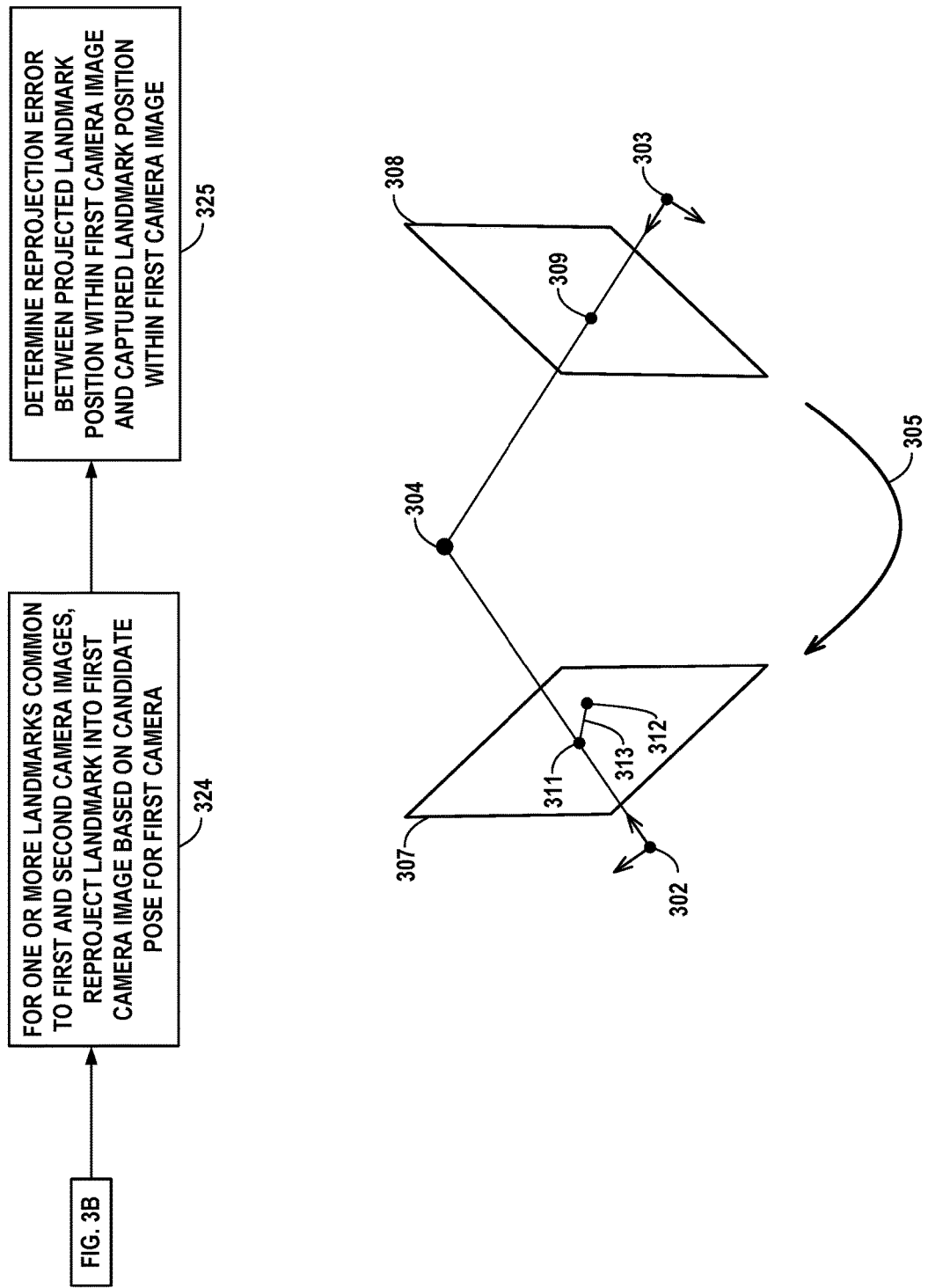
FIG. 3C is a diagram that illustrates one example of determining a reprojection error for a landmark projected into a first camera image based on the candidate pose for the first camera of FIGS. 3A-3B.

In this regard, FIG. 3C illustrates a camera image 307 captured by the first camera 302 and the corresponding camera image 308 captured by the second camera 303 that was identified at block 321. Further, a schematic three-dimensional representation of the landmark 304 is shown at a particular location and orientation with respect to pose of second camera 303, which may be derived based on the location 309 of the landmark 304 within the second image 308 and the visual map generated from SfM. As shown in FIG. 3C, the candidate extrinsics transformation 305 may be applied to the pose of the second camera 303 to determine a candidate pose for the first camera, shown as the candidate pose for the first camera 302.

The reprojection of the landmark 304 into the image 307 is shown at the location 311, which may differ from the actual, captured location of the landmark 304 within the image 307, which is shown at location 312. The difference between the two locations is reflected in FIG. 3C as a reprojection error 313 within image 307. In this regard, it should be understood that comparing the location 311 of a reprojected landmark to the captured location 312 of the landmark within the image 307 may be undertaken at a relatively high level of accuracy, on the order of individual pixels within the image 307.

As noted above, the determination of the reprojection error 313 shown in FIC. 3C for a single pair of images captured by the first and second camera may be performed across each pair of captured images. Further the example shown in FIG. 3C shows the reprojection of only a single common landmark into the image captured by the first camera 303. However, the reprojection of multiple common landmarks, in potentially different combinations for each pair of images, is also contemplated herein.

Based on the aggregated reprojection error across the pairs of images, an updated candidate extrinsics transformation may be determined, and with it an updated candidate pose of the first camera 302, with the goal of reducing the aggregated reprojection error across the pairs of images. In this regard, the updated candidate pose of the first camera 302 may be used to determine, for each image captured by the first camera 302, an updated reprojection of the landmark 304 into the image 307. An updated reprojection error may be determined, which may be smaller than the previous reprojection error, and so on. Accordingly, a least-squares optimization or similar optimization technique may be utilized, resulting in an identification of one particular extrinsics transformation that minimizes the reprojection error as evaluated across the various images captured by the first camera, which may then be used as the extrinsics between the first and second cameras.

Figure 4A:
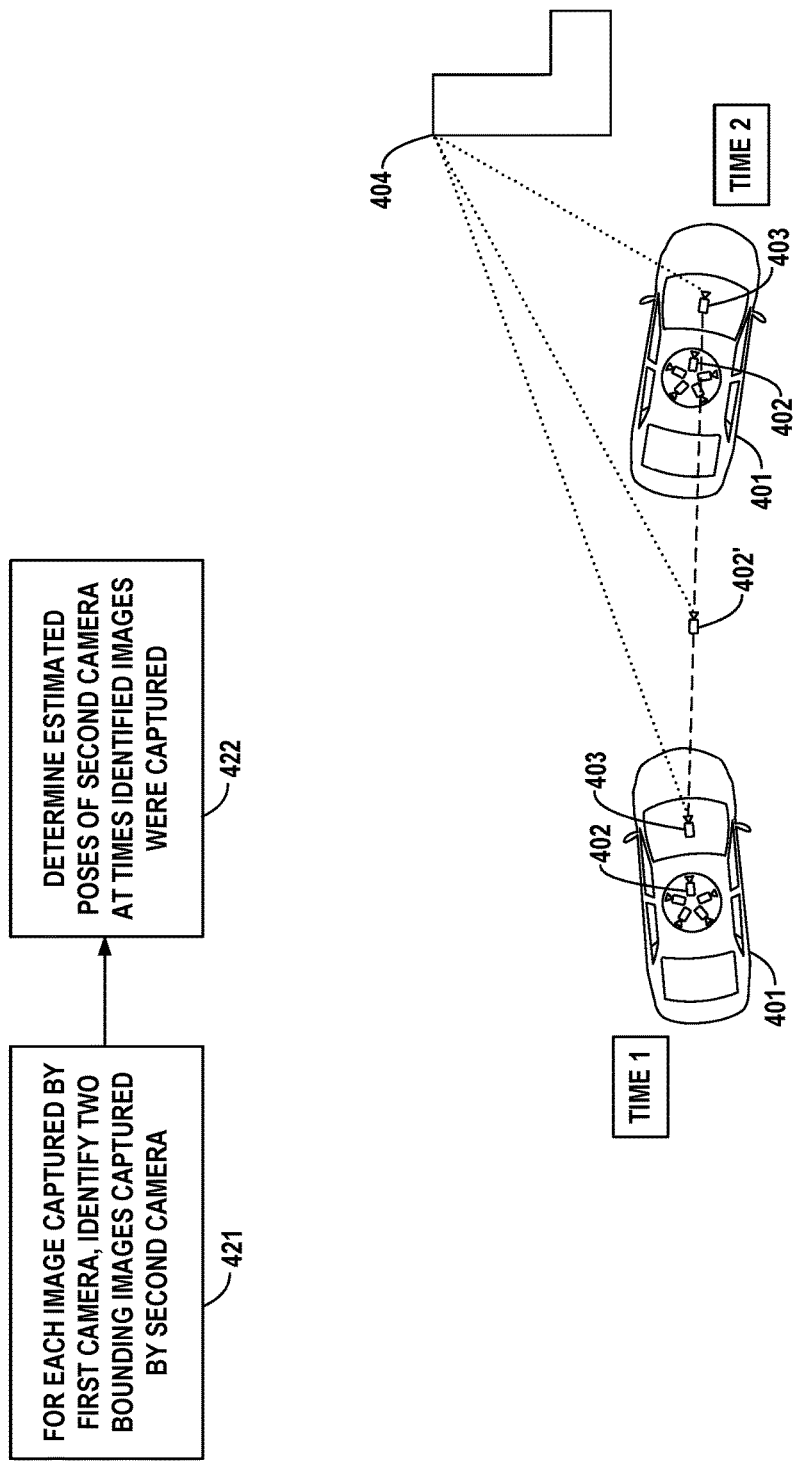
FIG. 4A is a diagram that illustrates one example of identifying, for an image captured by a first camera, two bounding images captured by a second camera and estimated poses for the second camera at the times the two bounding images were captured.
Figure 4B:
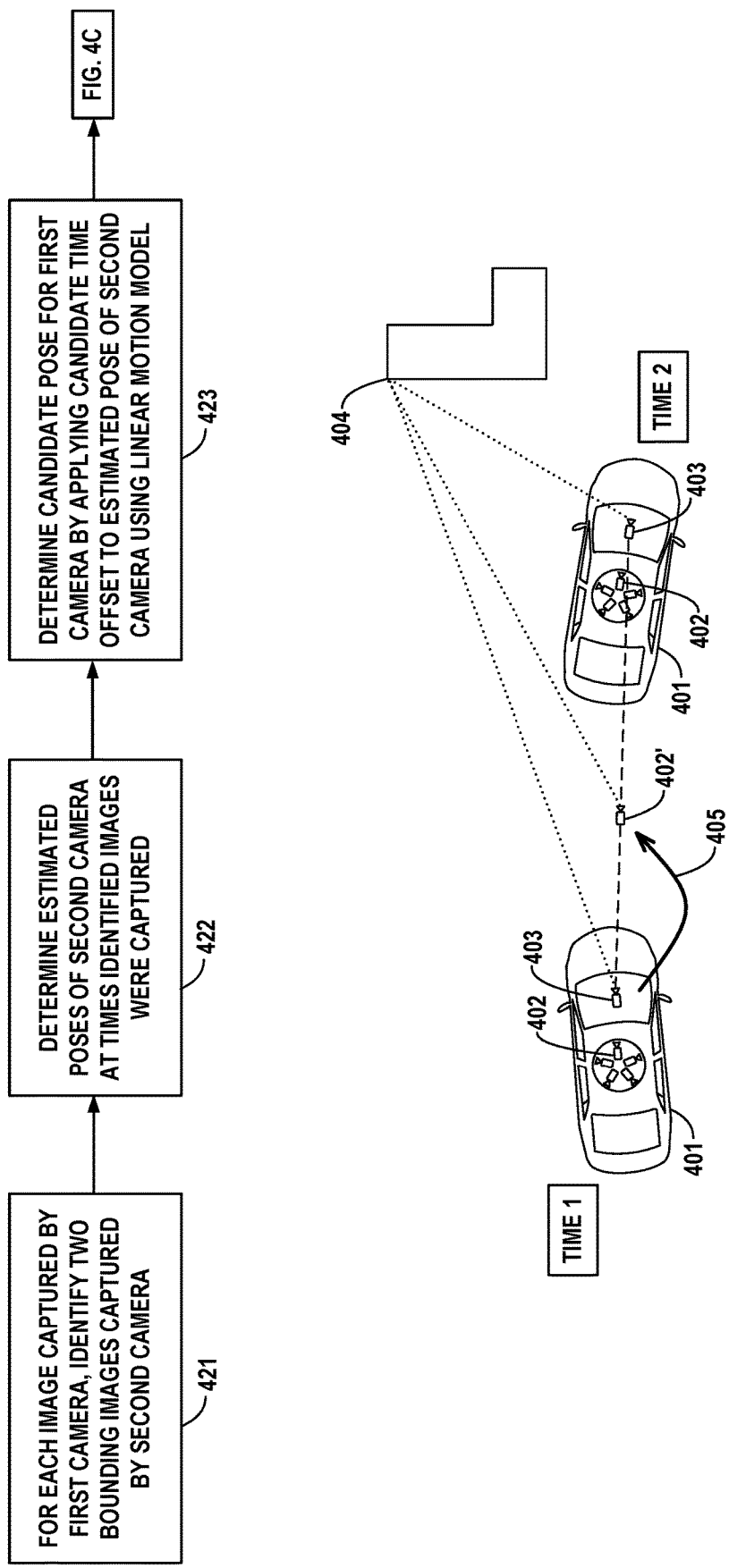
FIG. 4B is a diagram that illustrates one example of determining a candidate pose for the first camera of FIG. 4A based on a candidate time offset between the first and second cameras.
Figure 4C:
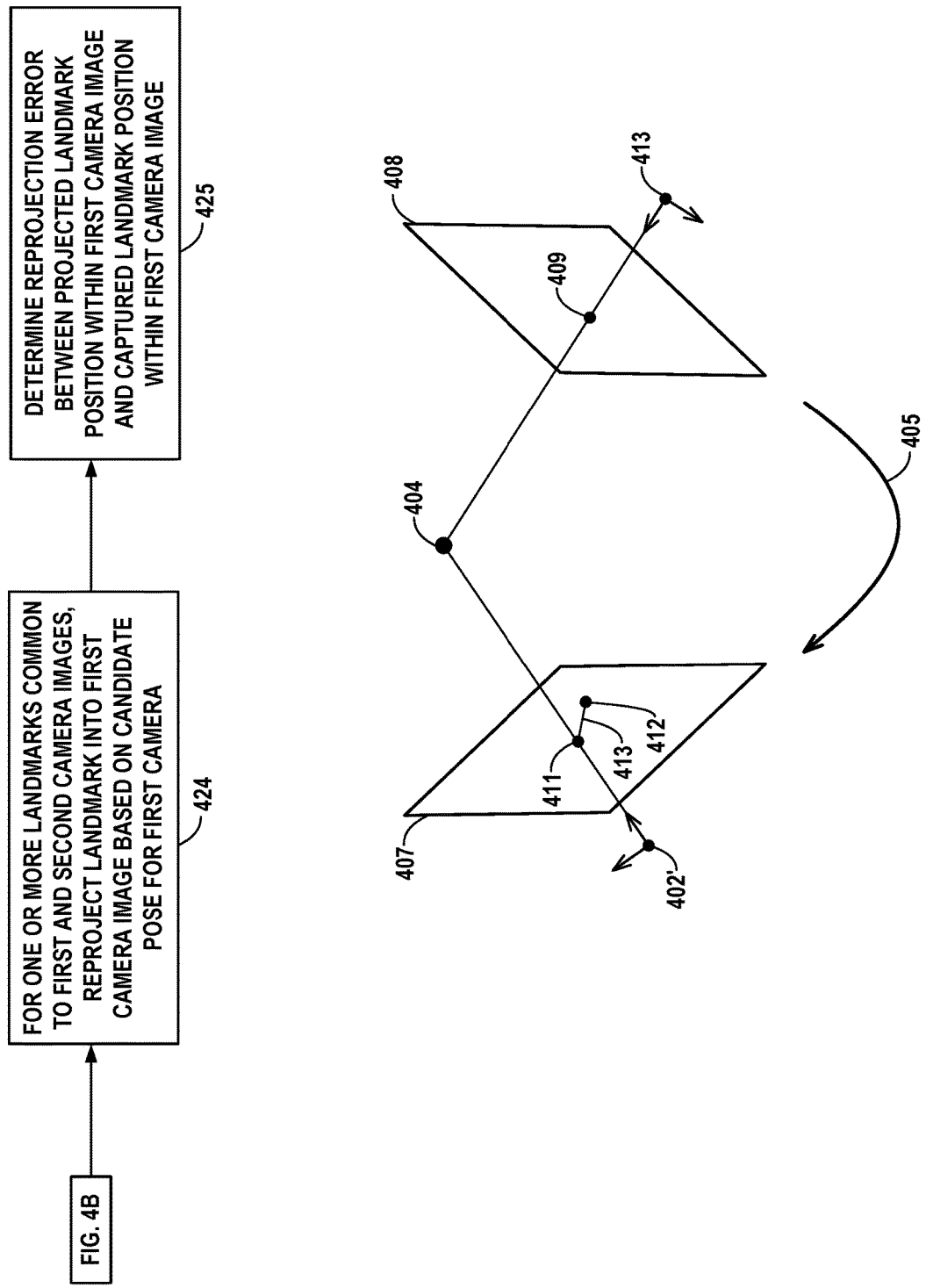
FIG. 4C is a diagram that illustrates one example of determining a reprojection error for a landmark projected into a first camera image based on the candidate pose for the first camera of FIGS. 4A-4B.

Turning now to FIGS. 4A-4C, one example of utilizing the techniques discussed herein to determine a time offset between a first camera and a second camera is illustrated, including an example pipeline of functions that may be carried out by a computing platform based on image data obtained by a vehicle 401. In this regard, the vehicle 401 may be similar to the vehicle 301 discussed above with respect to FIGS. 3A-3C. As one possibility, the vehicle 401, the first camera 402, the second camera 403, and the building 404 shown in FIGS. 4A-4C may be the same as those shown in FIGS. 3A-3C. As another possibility, the vehicle 401 may be a different vehicle that followed a similar trajectory to vehicle 301 at a different time. Accordingly, the pipeline of functions discussed with respect to FIGS. 4A-4C may be performed in sequence with (e.g., after) the functions discussed above with respect to FIGS. 3A-3C, or they may be performed independently of determining an extrinsics transformation.

As noted above, determining the time offset between the first camera 402 and the second camera 403 may be modeled on the assumption that there is no extrinsics transformation between the two cameras. Although technically inaccurate, this assumption may provide a basis for determining a candidate time offset between the two cameras, as discussed below. Further, for any two consecutive images captured by the first or second camera, it may be assumed that the vehicle followed a linear motion model, which may be used as a basis to estimate intermediate poses between the two captured images. As above, although this assumption may be technically inaccurate, the distance between any two consecutive images captured by the second camera 403 may be relatively small, depending on the capture rate of the second camera 403. For instance, the second camera 403 may capture images at a rate of 30 frames per second (fps). Accordingly, this relatively small time gap between images may cause any inaccuracies resulting from the linear motion assumption to be insubstantial. Nonetheless, when identifying image data to perform the functions discussed with respect to FIGS. 4A-4C, the computing device might exclude time periods during which the telematics information associated with the capture image data indicates a high degree of rotational change in the vehicle's yaw direction, which may indicate that the vehicle was engaged in a particularly non-linear driving path (e.g., engaged in a tight turns). Thus, scenes during which the linear motion assumption noted above may lead to greater inaccuracy may be avoided.

As shown by way of illustration in FIG. 4A, the second camera 403 may capture an image at Time 1, which may be reflected as a timestamp associated with the image. However, due to the time offset between the first and second cameras, the first camera 402 may capture a corresponding image having a timestamp of Time 1 at a position that is slightly offset from where the second camera 403 was located when it captured its Time 1 image. This is reflected in FIG. 4A by a pose for a camera 402' that is situated along a linear path between the poses of the second camera 403 at Time 1 and Time 2. In this regard, the first camera 402' may represent the pose location of the first camera 402 under the assumption that it is co-located with the second camera 403 (i.e., the first camera 402 including a time offset, but not an extrinsics transformation). In practice, the arrangement shown in FIG. 4A indicates that the clock of the first camera 402 is behind the clock of the second camera 403, because the first camera 402 captures a Time 1 image at a point along the vehicle's trajectory that is after the second camera 403 captures a Time 1 image.

Based on the relationship modeled above, the determination of the time offset between the first camera 402 and the second camera 403 may begin at block 421 by identifying, for each image captured by the first camera 402, a pair of bounding images captured by the second camera 403. In this regard, the bounding images captured by the second camera 403 may be the next closest image captured before, and the next closest image captured after, the image captured by the first camera 402. As shown in FIG. 4A, the computing device may identify bounding images captured by the second camera 403 that include respective timestamps Time 1 and Time 2.

The bounding images captured by the second camera 403 may be identified in various ways. As one possibility, GPS information associated with the image captured by the first camera 402 may be used as a basis to identify the bounding images. As another possibility, if an extrinsics transformation has already been determined according to the functions discussed above in FIGS. 3A-3C, the inverse of the determined extrinsics transformation may be applied to the pose of the first camera 402 to obtain a candidate pose for the camera 402'. A pose for the camera 402' may then be determined within a visual map generated (e.g., using SfM) from the image data captured by the second camera 403, which may facilitate identifying the two nearest poses, before and after, for the second camera 403. Other ways of identifying the bounding images are also possible.

Further, it should also be understood that the first camera 402 and the second camera 403 may capture image data at different rates. For instance, the first camera 402 may capture image data at 10 fps, whereas the second camera 403 may capture image data at 30 fps. Thus, the images captured by the second camera 403 may be more numerous.

At block 422, the computing platform may determine estimated poses of the second camera 403 at the two times that the bounding images were captured. For instance, the computing platform may determine a representation of the poses for the second camera 403 within the visual map generated from the image data captured by the second camera 403. Similar to the example discussed above in FIG. 3A, the visual map may also include three-dimensional representations of the building 404 and other landmarks within the field of view of the second camera 403, and the determined poses of the second camera 403 may be represented in relation to these landmarks.

Referring now to FIG. 4B, at block 423, the computing platform may determine a candidate pose for the first camera 402' by applying a candidate time offset to the estimated pose of the second camera 403 at the time one of the bounding images (e.g., the "before" image) was captured by the second camera 403. The candidate time offset is shown by way of example as an arrow 405 and may be initially determined in various ways. As one example, the computing platform may determine an initial candidate time offset that has a predetermined value, such as a midpoint between the two timestamps of the first and second bounding images. As another possibility, the computing platform may determine an initial candidate time offset by using an extrinsics transformation, if available, to estimate how far along the assumed linear path between the poses of the second camera the pose of the first camera 402' lies. This estimate, applied to the total time offset between the timestamps of the bounding images, may provide an initial candidate time offset. Other ways of determining an initial candidate time offset for the first camera 402 are also possible.

In turn, the initial candidate time offset for the camera 402 may be used to determine, at block 423, an initial candidate pose for the first camera 402' between the poses of the second camera 403 at Time 1 and Time 2. For example, because the motion of the vehicle 401 is assumed to be linear between the bounding images captured by the second camera 403, the difference between the poses of the second camera 403 at Time 1 and Time 2 may also be assumed to change linearly. For example, if the magnitude of the candidate time offset between Time 1 and Time 2 is 40% of the total time difference between Time 1 and Time 2, then the candidate pose for the first camera 402' may be represented as a 40% change in the total difference between the poses of the second camera 403 from Time 1 to Time 2 (e.g., a translation that is 40% of the total translation, and a rotation that is 40% of the total rotation).

Turning now to FIG. 4C, once a candidate pose for the first camera 402' is determined, one or more optimization techniques may be utilized to determine a time offset that minimizes reprojection errors in a manner that is substantially similar to the optimization described above for the extrinsics transformation in FIG. 3C. For instance, FIG. 4C illustrates a camera image 407 captured by the first camera 402 and one of the corresponding bounding images 408 captured by the second camera 403 (e.g., the "before" bounding image). A schematic three-dimensional representation of the landmark 404 is shown at a particular location and orientation with respect to pose of second camera 403, which may be derived based on the location 409 of the landmark 404 within the second image 408 and the visual map generated from SfM. As shown in FIG. 4C, the candidate time offset 405 may be applied to the pose of the second camera 403 to determine a candidate pose for first camera 402'.

Similar to FIG. 3C, the reprojection of the landmark 404 into the image 407 is shown at the location 411, which may differ from the actual, captured location of the landmark 404 within the image 407, which is shown at location 412. The difference between the two locations is reflected in FIG. 4C as a reprojection error 413 within image 407.

As noted above, the determination of the reprojection error 413 shown in FIC. 4C may be determined for each image captured by the first camera 402, and may in practice involve multiple common landmarks that are included in the images captured by the first and second cameras. Based on the aggregated reprojection error across the images captured by the first camera 402, an updated candidate time offset may be determined, and with it an updated candidate pose for the first camera 402', with the goal of reducing the reprojection error across the images captured by the first camera 402. These steps may be iterated, as discussed with respect to FIG. 3C, using a least-squares optimization or similar optimization technique, resulting in an identification of one particular time offset that minimizes the reprojection error as evaluated across the various images captured by the first camera 402, which may then be used as the time offset between the first and second cameras.

While the processes for determining the extrinsics between the two cameras and the time offset between the two cameras are described independently above, in practice, these parameters will both be non-zero and their determination will be dependent on one another. In this respect, there are several approaches that may be used to jointly determine both the extrinsics between the two cameras and the time offset between the two cameras Turning to FIGS. 5A-5C, one example of combining the techniques discussed above to determine both an extrinsics transformation and a time offset between a first camera and a second camera is illustrated, including an example pipeline of functions that may be carried out by a computing platform based on image data obtained by a vehicle 501. In this regard, the vehicle 501 may be similar to the vehicles 301 and 401 discussed above.

Figure 5A:
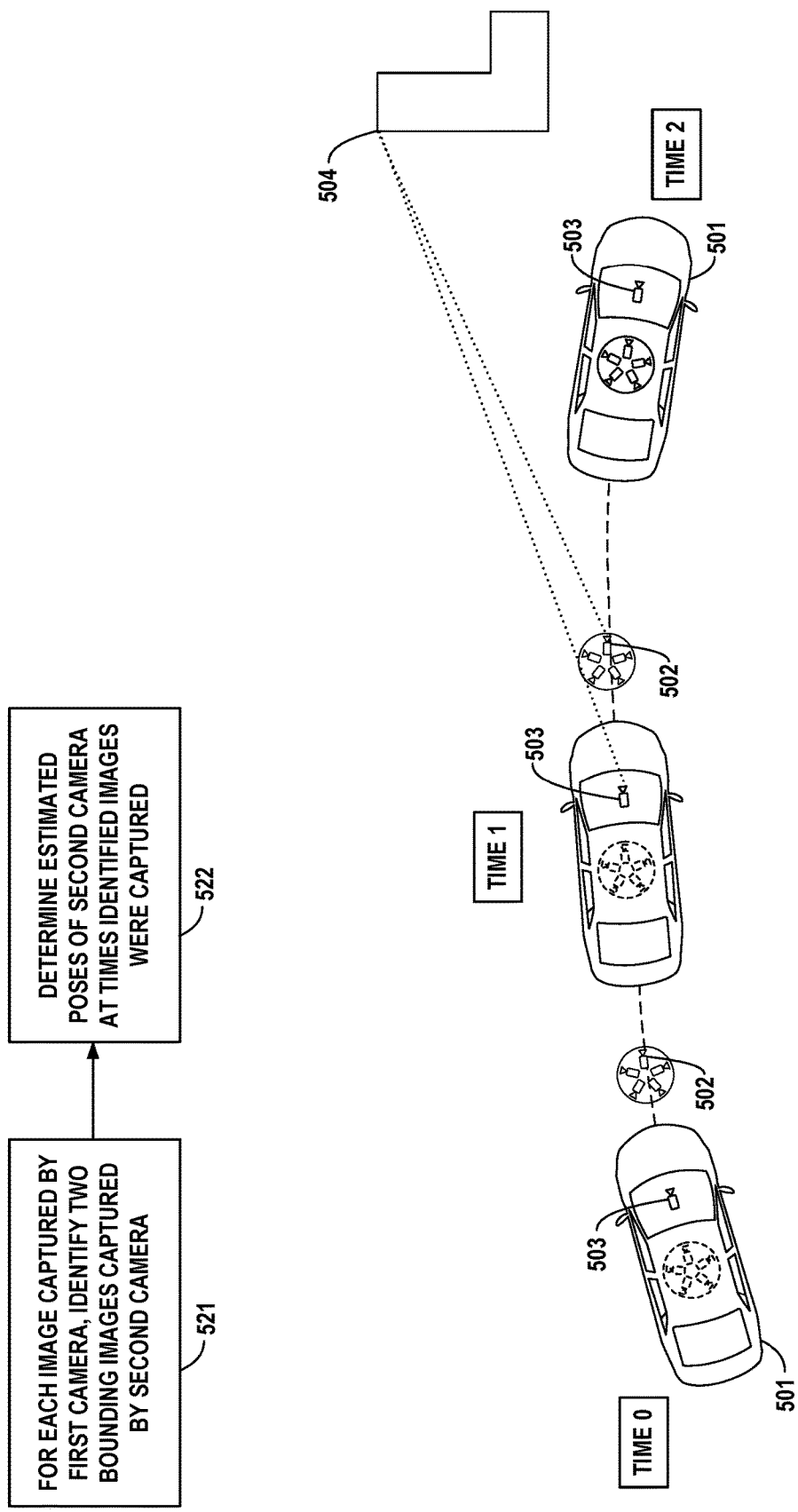
FIG. 5A is a diagram that illustrates one example of identifying, for an image captured by a first camera, two bounding images captured by a second camera and estimated poses for the second camera at the times the two bounding images were captured.

As shown in FIG. 5A, the computing device may identify, at block 521, a pair of bounding images captured by a second camera 503 for each image captured by a first camera 502. In this regard, the functions carried out by the computing platform at block 521 may be similar to the functions carried out at block 421 discussed above with respect to FIG. 4A. For instance, bounding images captured by the second camera 503 with a timestamp of Time 0 (e.g., a "before" image) and a timestamp of Time 1 (e.g., an "after" image) may be identified for an image captured by the first camera 502 that falls between the two bounding images, and likewise for the image captured by the first camera 502 that falls between the images captured by the second camera having timestamps of Time 1 (e.g., now a "before" image) and Time 2 (e.g., an "after" image). The computing platform may identify the bounding images for each image captured by the first camera 502 in various ways, as discussed above with respect to block 421.

At block 522, the computing platform may determine estimated poses for the second camera 503 at the two times that the identified bounding images were captured. For instance, the computing platform may determine a representation of the estimated poses for the second camera 503 within a visual map generated from the image data captured by the second camera 503 (e.g., using SfM). Similar to the examples discussed above in FIG. 3A and FIG. 4A, the visual map may also include three-dimensional representations of the building 504 and other landmarks within the field of view of the second camera 503, and the estimated poses of the second camera 503 may be represented in relation to these landmarks.

Figure 5B:
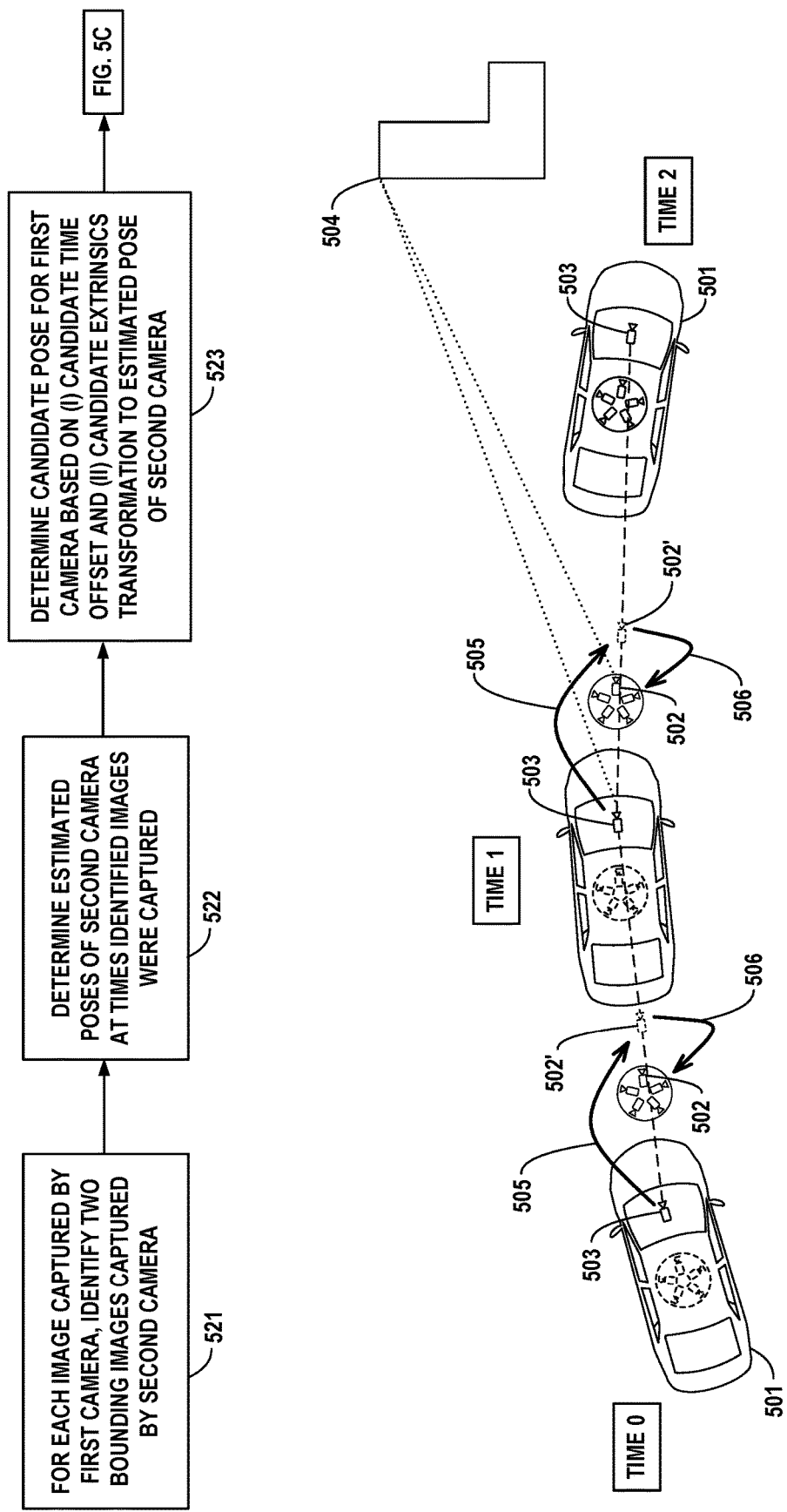
FIG. 5B is a diagram that illustrates one example of determining a candidate pose for the first camera of FIG. 5A based on a candidate time offset and a candidate extrinsics transformation between the first and second cameras.

Turning to FIG. 5B, the computing platform may, at block 523, determine a candidate pose for the first camera 502 by applying both a candidate time offset and a candidate extrinsics transformation to one of the bounding images captured by the second camera 503. For example, a candidate time offset, depicted by an arrow 505, may be applied along with a candidate extrinsics transformation, depicted by an arrow 506, to the estimated pose of the second camera 503 at Time 1, as shown in FIG. 5B. This, in turn, may yield the candidate pose for the first camera 502 shown.

In this respect, an initial candidate time offset 505 may be determined in one or more of the ways discussed above with respect to FIG. 4C. Similarly, an initial candidate extrinsics transformation 506 may be determined in one or more of the ways discussed above with respect to FIG. 3C.

As can be seen in FIG. 5B, the functions performed by the computing platform at block 523 assume the linear motion of the vehicle 501 between the bounding images captured by the second camera 503, as discussed above with respect to FIGS. 4A-4C. Thus, the hypothetical pose of the first camera 502' is shown for reference in FIG. 5B, representing the application of the candidate time offset 505 but not the candidate extrinsics transformation 506. However, this hypothetical pose of the first camera 502' may not be explicitly determined as an output of the functions of block 523. Rather, the candidate time offset 505 and the candidate extrinsics transformation 506 may be applied to the estimated pose of the second camera 503 by the computing platform as part of a single operation.

For example, the computing platform may input the candidate extrinsics transformation and the candidate time offset between the first and second cameras into the following equation to determine a candidate pose for the first camera:

$$P1 = ET_{1-2} * (P2_{BEF} + [TO_{102}/(T_{AFT} - T_{BEF})] * [P2_{AFT} - P2_{BEF}])$$

where P1 is the candidate pose of the first camera, $P2_{BEF}$ is the estimated pose of the second camera when the "before" image was captured by the second camera at time $T_{BEF}$, $P2_{AFT}$ is the estimated pose of the second camera when the "after" image was captured by the second camera at time $T_{AFT}$, $ET_{1-2}$ is the candidate extrinsics transformation between the first camera and the second camera, and $TO_{1-2}$ is the candidate time offset between the first camera and the second camera.

Figure 5C:
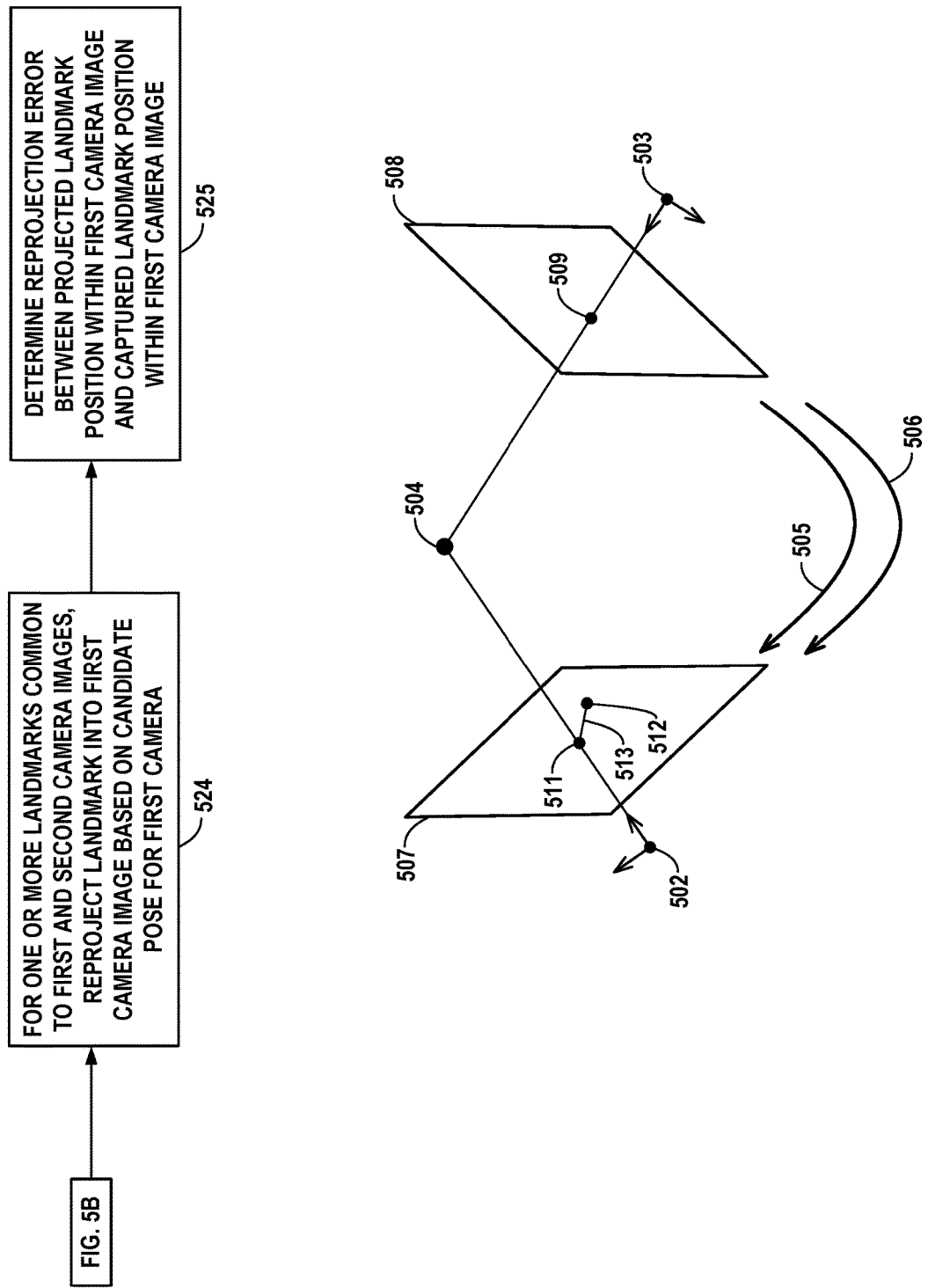
FIG. 5C is a diagram that illustrates one example of determining a reprojection error for a landmark projected into a first camera image based on the candidate pose for the first camera of FIGS. 5A-5B.

Referring now to FIG. 5C, once a candidate pose for the first camera 502 is determined, one or more optimization techniques may be utilized to determine a combination of (i) a time offset and (ii) an extrinsics transformation that minimizes reprojection errors in a manner that is substantially similar to the optimization described above with respect to FIG. 3C and FIG. 4C. For instance, FIG. 5C illustrates a camera image 507 captured by the first camera 502 and one of the corresponding bounding images 508 captured by the second camera 503 (e.g., the "before" bounding image). A schematic three-dimensional representation of the landmark 504 is shown at a particular location and orientation with respect to pose of second camera 503, which may be derived based on the location 509 of the landmark 504 within the second image 508 and the visual map generated from SfM. As shown in FIG. 5C, both the candidate time offset 505 and the candidate extrinsics transformation 506 may be applied to the pose of the second camera 503 to determine the candidate pose for first camera 502.

As above, the reprojection of the landmark 504 into the image 507 is shown at the location 511, which may differ from the actual, captured location of the landmark 504 within the image 507, which is shown at location 512. The difference between the two locations is reflected in FIG. 5C as a reprojection error 513 within image 507.

As discussed in the examples above, the determination of the reprojection error 513 shown in FIC. 5C may be determined for each image captured by the first camera 502, and may in practice involve multiple common landmarks that are included in the images captured by the first and second cameras. Based on the aggregated reprojection errors 513 across the images captured by the first camera 502, one or both of an updated candidate time offset and an updated candidate extrinsics transformation may be determined, and thus an updated candidate pose for the first camera 502, with the goal of reducing the reprojection error. As in the examples above, these steps may be iterated utilizing one or more optimization techniques (e.g., a least squares optimization). Preferably, the end result of this optimization is one particular combination of (i) a time offset and (ii) an extrinsics transformation that minimizes aggregated reprojection error as evaluated across the various images captured by the first camera 502, which may then be used as the extrinsics transformation and time offset between the first and second cameras.

However, in some cases, this optimization described with respect to FIG. 5C may result in the identification of multiple different combinations of an extrinsics transformation and a time offset that minimize the reprojection error, in which case further evaluation may be necessary in order to determine the extrinsics and time offset between the first and second cameras. As one possibility, the extrinsics transformation and time offset between the two cameras may be jointly determined in a multi-stage process that takes advantage of certain unique constraints that may exist within the image data captured by the first and second cameras.

For example, as discussed above with respect to FIGS. 3A-3C, the determination of an extrinsics transformation between the two cameras may be undertaken by assuming that the two cameras are synchronized and thus there is no time offset between them. Although this assumption may be nominally incorrect in many cases, there may nonetheless be periods of operation of the vehicle 501 during which this assumption is effectively accurate. For example, image data captured by the first and second cameras when the vehicle 501 is stationary (e.g., standing at a traffic light) may be treated as though they was captured at the same time since the location of the first and second cameras with respect to any common landmarks in the vehicle's surrounding environment does not change during this period.

Accordingly, in some cases it may be possible for the computing platform to determine a relatively accurate extrinsics transformation as a first stage of determining a calibration between the first and second cameras, based on image data captured when the vehicle 501 was stationary. For instance, the computing platform may query available image data captured by the first camera 502 to identify images for a given scene during which the velocity of the vehicle 501 was zero. Corresponding images captured by the second camera 503 may then be identified by querying the image data captured by the second camera 503 for images having substantially the same GPS coordinates as the first images. In this regard, even though the vehicle 501 is stationary during the given scene, image data for several seconds may be identified from both the first and second cameras. This may facilitate the feature matching aspects of the SfM techniques that are used by the computing platform to identify common landmarks that remain stationary in the respective images, while discounting agents (e.g., other vehicles, pedestrians) that may be moving during the given time period. Once the images captured by the first and second cameras are identified, the computing platform may then proceed with the optimization techniques as discussed above and shown in FIGS. 3A-3C, resulting in a determination of the extrinsics transformation between the first and second cameras.

The computing device may then determine the time offset between the first and second cameras as the second stage of determining the calibration between the first and second cameras. For instance, the computing device may determine the time offset between the first and second cameras by performing the functions shown and discussed above with respect to FIGS. 5A-5C while keeping the already-determined extrinsics transformation fixed throughout the optimization process.

Various other ways of determining the extrinsics transformation and time offset between two cameras as part of a multi-stage process consistent with the examples above are also possible.

The disclosed techniques for determining a calibration between two cameras may enable various different uses for the image data captured by one or both of the cameras.

As a first example, the techniques discussed above may be utilized to determine a calibration between (i) a lower-cost sensor system that includes a camera but not a LiDAR unit and (ii) a higher-cost sensor system that includes at least one camera and a LIDAR unit that are pre-calibrated with one another. The determined calibration between these two sensor systems may be used to establish a mapping between the LiDAR data captured by the higher-cost sensor system and the image data captured by the lower-cost sensor system, which may then be used as training data for machine learning models (e.g., models that detect agents in image data captured by lower-cost sensor systems.

Figure 6:
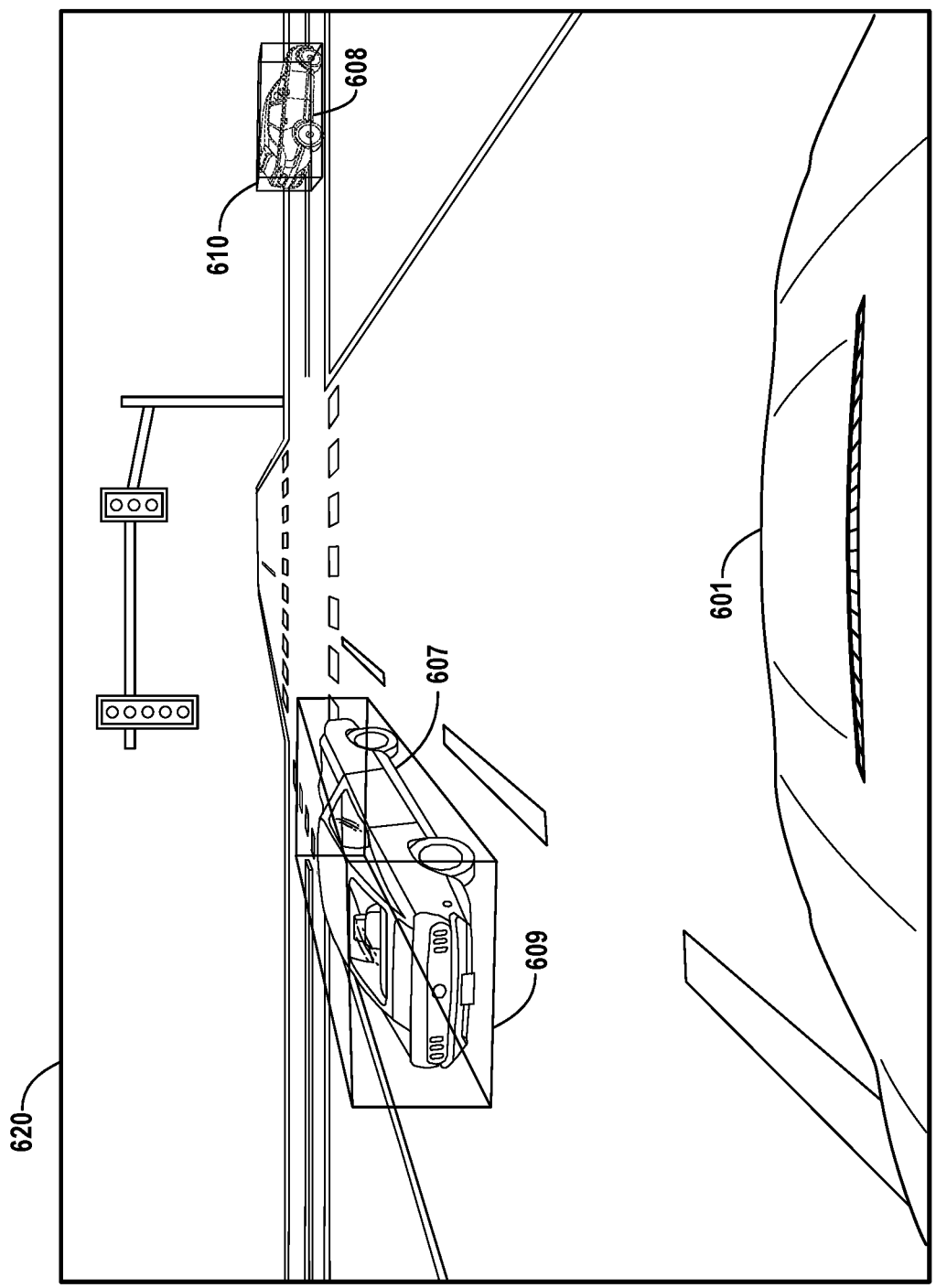
FIG. 6 is a diagram that illustrates another example of projecting bounding boxes derived from a vehicle's captured LiDAR data into an image captured by a separately-mounted camera on the vehicle.

FIG. 6 provides one illustration of this type of mapping between different sensor systems. For example, FIG. 6 shows an image 620 captured by a lower-cost, camera-based sensor system mounted within a vehicle 601. The image 620 includes a representation of a first vehicle 607 and a second vehicle 608. FIG. 6 also depicts LiDAR-based bounding boxes 609 and 610 for the two vehicles, which may have been derived from LiDAR data captured by a higher-cost, LiDAR-based sensor system mounted on vehicle 601. As can be seen in FIG. 6, the bounding boxes are accurately projected into the image 620 and fit the corresponding vehicles based on the accurate spatial and temporal calibration between the two sensor systems.

Accordingly, FIG. 6 illustrates an improvement over the example shown in FIG. 1C, which depicted the difficulty in using current methods to determine an accurate mapping between LiDAR data captured by a LiDAR based sensor system and image data captured by a separate, uncalibrated camera-based sensor system.

As another example, the techniques discussed above may be utilized to determine a calibration between a lower-fidelity sensor system that includes a camera and a higher-fidelity sensor system that includes at least one camera. The determined calibration between these two sensor systems may be used to derive trajectories from sensor data captured by the lower-fidelity sensor system that are spatially and temporally aligned with trajectories derived from sensor data captured by the higher-fidelity sensor system. This alignment may allow the trajectories derived from the lower-fidelity sensor data to be evaluated against the trajectories derived from the higher-fidelity sensor data and/or used as path priors (e.g., path priors encoded into map data) for vehicles equipped with higher-fidelity sensor systems.

As another example, the techniques discussed above may be utilized to monitor how an extrinsics transformation between two cameras installed at a vehicle compares to a previously-determined extrinsics transformation between the two cameras (e.g., a factory calibration between the two cameras that was established in a controlled environment). For example, the extrinsics transformation between two different cameras of a LiDAR-based sensor system may be monitored to determine whether one of the cameras has shifted as a result of a vehicle impact.

Various other examples are possible as well.

As noted, the camera calibration techniques discussed above may be used in conjunction with a sensor-equipped vehicle. One possible example of such a vehicle will now be discussed in greater detail.

Figure 7:
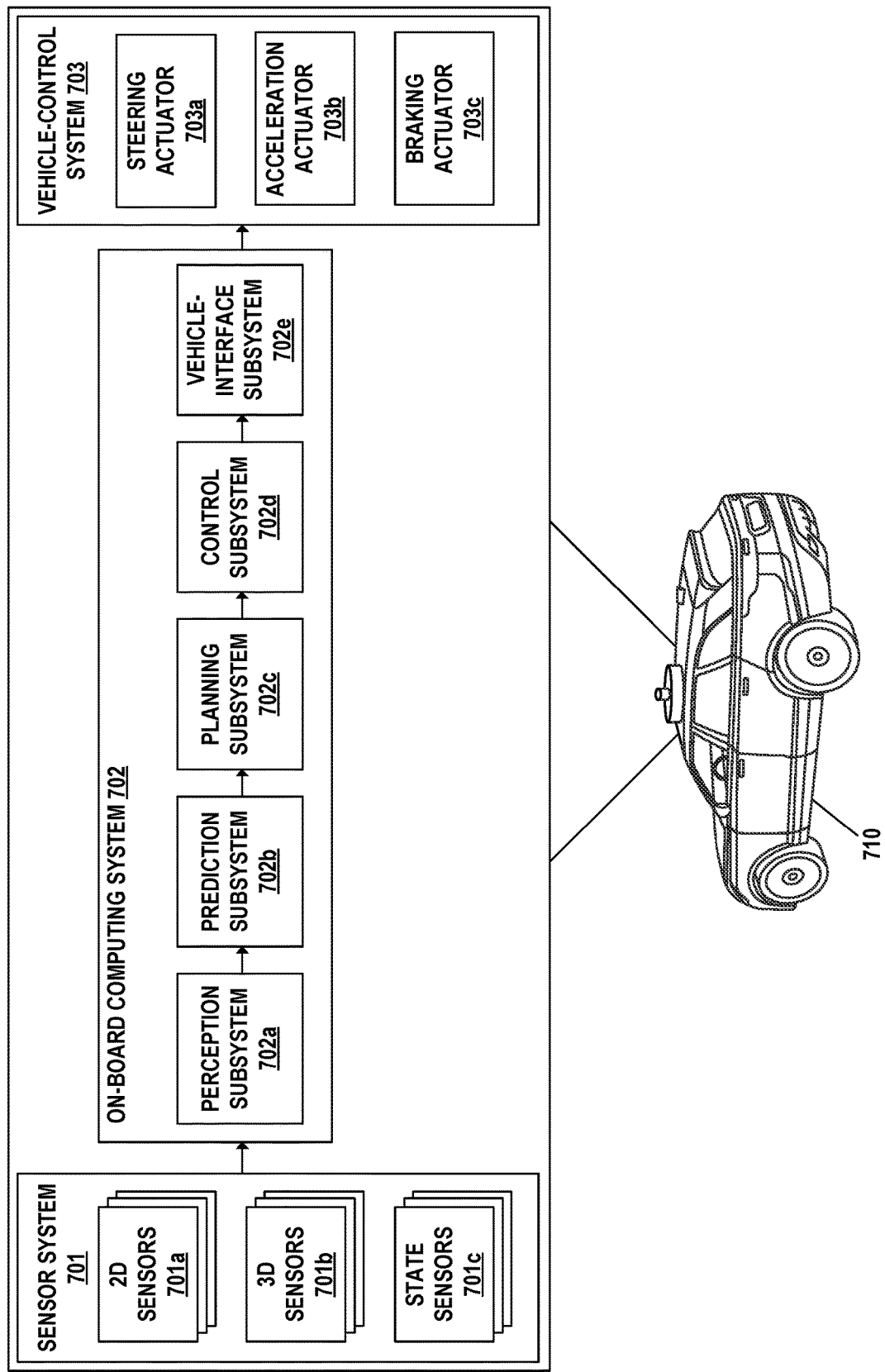
FIG. 7 is a simplified block diagram that illustrates certain systems that may be included in an example vehicle.

Turning to FIG. 7, a simplified block diagram is provided to illustrate certain systems that may be included in an example vehicle 700. As shown, at a high level, vehicle 700 may include at least (i) a sensor system 701 that is configured to capture sensor data that is representative of the real-world environment being perceived by the vehicle (i.e., the collection vehicle's "surrounding environment") and/or the collection vehicle's operation within that real-world environment, (ii) an on-board computing system 702 that is configured to perform functions related to autonomous operation of vehicle 700 (and perhaps other functions as well), and (iii) a vehicle-control system 703 that is configured to control the physical operation of vehicle 700, among other possibilities. Each of these systems may take various forms.

In general, sensor system 701 may comprise any of various different types of sensors, each of which is generally configured to detect one or more particular stimuli based on vehicle 700 operating in a real-world environment. The sensors then output sensor data that is indicative of one or more measured values of the one or more stimuli at one or more capture times (which may each comprise a single instant of time or a range of times).

For instance, as one possibility, sensor system 701 may include one or more 2D sensors 701a that are each configured to capture 2D sensor data that is representative of the vehicle's surrounding environment. Examples of 2D sensor(s) 701a may include a single 2D camera, a 2D camera array, a 2D RADAR unit, a 2D SONAR unit, a 2D ultrasound unit, a 2D scanner, and/or 2D sensors equipped with visible-light and/or infrared sensing capabilities, among other possibilities. Further, in an example implementation, 2D sensor(s) 701a may have an arrangement that is capable of capturing 2D sensor data representing a 360° view of the vehicle's surrounding environment, one example of which may take the form of an array of 6-7 cameras that each have a different capture angle. Other 2D sensor arrangements are also possible.

As another possibility, sensor system 701 may include one or more 3D sensors 701b that are each configured to capture 3D sensor data that is representative of the vehicle's surrounding environment. Examples of 3D sensor(s) 701b may include a LiDAR unit, a 3D RADAR unit, a 3D SONAR unit, a 3D ultrasound unit, and a camera array equipped for stereo vision, among other possibilities. Further, in an example implementation, 3D sensor(s) 701b may comprise an arrangement that is capable of capturing 3D sensor data representing a 360° view of the vehicle's surrounding environment, one example of which may take the form of a LiDAR unit that is configured to rotate 360° around its installation axis. Other 3D sensor arrangements are also possible.

As yet another possibility, sensor system 701 may include one or more state sensors 701c that are each configured capture sensor data that is indicative of aspects of the vehicle's current state, such as the vehicle's current position, current orientation (e.g., heading/yaw, pitch, and/or roll), current velocity, and/or current acceleration of vehicle 700. Examples of state sensor(s) 701c may include an IMU (which may be comprised of accelerometers, gyroscopes, and/or magnetometers), an Inertial Navigation System (INS), a Global Navigation Satellite System (GNSS) unit such as a GPS unit, among other possibilities.

Sensor system 701 may include various other types of sensors as well.

In turn, on-board computing system 702 may generally comprise any computing system that includes at least a communication interface, a processor, and data storage, where such components may either be part of a single physical computing device or be distributed across a plurality of physical computing devices that are interconnected together via a communication link. Each of these components may take various forms.

For instance, the communication interface of on-board computing system 702 may take the form of any one or more interfaces that facilitate communication with other systems of vehicle 700 (e.g., sensor system 701, vehicle-control system 703, etc.) and/or remote computing systems (e.g., a transportation-matching system), among other possibilities. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols.

Further, the processor of on-board computing system 702 may comprise one or more processor components, each of which may take the form of a general-purpose processor (e.g., a microprocessor), a special-purpose processor (e.g., an application-specific integrated circuit, a digital signal processor, a graphics processing unit, a vision processing unit, etc.), a programmable logic device (e.g., a field-programmable gate array), or a controller (e.g., a microcontroller), among other possibilities.

Further yet, the data storage of on-board computing system 702 may comprise one or more non-transitory computer-readable mediums, each of which may take the form of a volatile medium (e.g., random-access memory, a register, a cache, a buffer, etc.) or a non-volatile medium (e.g., read-only memory, a hard-disk drive, a solid-state drive, flash memory, an optical disk, etc.), and these one or more non-transitory computer-readable mediums may be capable of storing both (i) program instructions that are executable by the processor of on-board computing system 702 such that on-board computing system 702 is configured to perform various functions related to the autonomous operation of vehicle 700 (among other possible functions), and (ii) data that may be obtained, derived, or otherwise stored by on-board computing system 702.

In one embodiment, on-board computing system 702 may also be functionally configured into a number of different subsystems that are each tasked with performing a specific subset of functions that facilitate the autonomous operation of vehicle 700, and these subsystems may be collectively referred to as the vehicle's "autonomy system." In practice, each of these subsystems may be implemented in the form of program instructions that are stored in the on-board computing system's data storage and are executable by the on-board computing system's processor to carry out the subsystem's specific subset of functions, although other implementations are possible as well—including the possibility that different subsystems could be implemented via different hardware components of on-board computing system 702.

As shown in FIG. 7, in one embodiment, the functional subsystems of on-board computing system 702 may include (i) a perception subsystem 702a that generally functions to derive a representation of the surrounding environment being perceived by vehicle 700, (ii) a prediction subsystem 702b that generally functions to predict the future state of each object detected in the vehicle's surrounding environment, (iii) a planning subsystem 702c that generally functions to derive a behavior plan for vehicle 700, (iv) a control subsystem 702d that generally functions to transform the behavior plan for vehicle 700 into control signals for causing vehicle 700 to execute the behavior plan, and (v) a vehicle-interface subsystem 702e that generally functions to translate the control signals into a format that vehicle-control system 703 can interpret and execute. However, it should be understood that the functional subsystems of on-board computing system 702 may take various other forms as well. Each of these example subsystems will now be described in further detail below.

For instance, the subsystems of on-board computing system 702 may begin with perception subsystem 702a, which may be configured to fuse together various different types of "raw" data that relate to the vehicle's perception of its surrounding environment and thereby derive a representation of the surrounding environment being perceived by vehicle 700. In this respect, the "raw" data that is used by perception subsystem 702*a* to derive the representation of the vehicle's surrounding environment may take any of various forms.

For instance, at a minimum, the "raw" data that is used by perception subsystem 702*a* may include multiple different types of sensor data captured by sensor system 701, such as 2D sensor data (e.g., image data) that provides a 2D representation of the vehicle's surrounding environment, 3D sensor data (e.g., LiDAR data) that provides a 3D representation of the vehicle's surrounding environment, and/or state data for vehicle 700 that indicates the past and current position, orientation, velocity, and acceleration of vehicle 700. Additionally, the "raw" data that is used by perception subsystem 702*a* may include map data associated with the vehicle's location, such as high-definition geometric and/or semantic map data, which may be preloaded onto on-board computing system 702 and/or obtained from a remote computing system. Additionally yet, the "raw" data that is used by perception subsystem 702*a* may include navigation data for vehicle 700 that indicates a specified origin and/or specified destination for vehicle 700, which may be obtained from a remote computing system (e.g., a transportation-matching system) and/or input by a human riding in vehicle 700 via a user-interface component that is communicatively coupled to on-board computing system 702. Additionally still, the "raw" data that is used by perception subsystem 702*a* may include other types of data that may provide context for the vehicle's perception of its surrounding environment, such as weather data and/or traffic data, which may be obtained from a remote computing system. The "raw" data that is used by perception subsystem 702*a* may include other types of data as well.

Advantageously, by fusing together multiple different types of raw data (e.g., both 2D sensor data and 3D sensor data), perception subsystem 702*a* is able to leverage the relative strengths of these different types of raw data in a way that may produce a more accurate and precise representation of the surrounding environment being perceived by vehicle 700.

Further, the function of deriving the representation of the surrounding environment perceived by vehicle 700 using the raw data may include various aspects. For instance, one aspect of deriving the representation of the surrounding environment perceived by vehicle 700 using the raw data may involve determining a current state of vehicle 700 itself, such as a current position, a current orientation, a current velocity, and/or a current acceleration, among other possibilities. In this respect, perception subsystem 702*a* may also employ a localization technique such as SLAM to assist in the determination of the vehicle's current position and/or orientation. (Alternatively, it is possible that on-board computing system 702 may run a separate localization service that determines position and/or orientation values for vehicle 700 based on raw data, in which case these position and/or orientation values may serve as another input to perception subsystem 702*a*).

Another aspect of deriving the representation of the surrounding environment perceived by vehicle 700 using the raw data may involve detecting objects within the vehicle's surrounding environment, which may result in the determination of class labels, bounding boxes, or the like for each detected object. In this respect, the particular classes of objects that are detected by perception subsystem 702*a* (which may be referred to as "agents") may take various forms, including both (i) "dynamic" objects that have the potential to move, such as vehicles, cyclists, pedestrians, and animals, among other examples, and (ii) "static" objects that generally do not have the potential to move, such as streets, curbs, lane markings, traffic lights, stop signs, and buildings, among other examples. Further, in practice, perception subsystem 702*a* may be configured to detect objects within the vehicle's surrounding environment using any type of object detection model now known or later developed, including but not limited object detection models based on convolutional neural networks (CNN).

Yet another aspect of deriving the representation of the surrounding environment perceived by vehicle 700 using the raw data may involve determining a current state of each object detected in the vehicle's surrounding environment, such as a current position (which could be reflected in terms of coordinates and/or in terms of a distance and direction from vehicle 700), a current orientation, a current velocity, and/or a current acceleration of each detected object, among other possibilities. In this respect, the current state of each detected object may be determined either in terms of an absolute measurement system or in terms of a relative measurement system that is defined relative to a state of vehicle 700, among other possibilities.

The function of deriving the representation of the surrounding environment perceived by vehicle 700 using the raw data may include other aspects as well.

Further yet, the derived representation of the surrounding environment perceived by vehicle 700 may incorporate various different information about the surrounding environment perceived by vehicle 700, examples of which may include (i) a respective set of information for each object detected in the vehicle's surrounding, such as a class label, a bounding box, and/or state information for each detected object, (ii) a set of information for vehicle 700 itself, such as state information and/or navigation information (e.g., a specified destination), and/or (iii) other semantic information about the surrounding environment (e.g., time of day, weather conditions, traffic conditions, etc.). The derived representation of the surrounding environment perceived by vehicle 700 may incorporate other types of information about the surrounding environment perceived by vehicle 700 as well.

Still further, the derived representation of the surrounding environment perceived by vehicle 700 may be embodied in various forms. For instance, as one possibility, the derived representation of the surrounding environment perceived by vehicle 700 may be embodied in the form of a data structure that represents the surrounding environment perceived by vehicle 700, which may comprise respective data arrays (e.g., vectors) that contain information about the objects detected in the surrounding environment perceived by vehicle 700, a data array that contains information about vehicle 700, and/or one or more data arrays that contain other semantic information about the surrounding environment. Such a data structure may be referred to as a "parameter-based encoding."

As another possibility, the derived representation of the surrounding environment perceived by vehicle 700 may be embodied in the form of a rasterized image that represents the surrounding environment perceived by vehicle 700 in the form of colored pixels. In this respect, the rasterized image may represent the surrounding environment perceived by vehicle 700 from various different visual perspectives, examples of which may include a "top down" view and a "bird's eye" view of the surrounding environment, among other possibilities. Further, in the rasterized image, the objects detected in the surrounding environment of vehicle 700 (and perhaps vehicle 700 itself) could be shown as color-coded bitmasks and/or bounding boxes, among other possibilities.

The derived representation of the surrounding environment perceived by vehicle 700 may be embodied in other forms as well.

As shown, perception subsystem 702a may pass its derived representation of the vehicle's surrounding environment to prediction subsystem 702b. In turn, prediction subsystem 702b may be configured to use the derived representation of the vehicle's surrounding environment (and perhaps other data) to predict a future state of each object detected in the vehicle's surrounding environment at one or more future times (e.g., at each second over the next 5 seconds)—which may enable vehicle 700 to anticipate how the real-world objects in its surrounding environment are likely to behave in the future and then plan its behavior in a way that accounts for this future behavior.

Prediction subsystem 702b may be configured to predict various aspects of a detected object's future state, examples of which may include a predicted future position of the detected object, a predicted future orientation of the detected object, a predicted future velocity of the detected object, and/or predicted future acceleration of the detected object, among other possibilities. In this respect, if prediction subsystem 702b is configured to predict this type of future state information for a detected object at multiple future times, such a time sequence of future states may collectively define a predicted future trajectory of the detected object. Further, in some embodiments, prediction subsystem 702b could be configured to predict multiple different possibilities of future states for a detected object (e.g., by predicting the 3 most-likely future trajectories of the detected object). Prediction subsystem 702b may be configured to predict other aspects of a detected object's future behavior as well.

In practice, prediction subsystem 702b may predict a future state of an object detected in the vehicle's surrounding environment in various manners, which may depend in part on the type of detected object. For instance, as one possibility, prediction subsystem 702b may predict the future state of a detected object using a data science model that is configured to (i) receive input data that includes one or more derived representations output by perception subsystem 702a at one or more perception times (e.g., the "current" perception time and perhaps also one or more prior perception times), (ii) based on an evaluation of the input data, which includes state information for the objects detected in the vehicle's surrounding environment at the one or more perception times, predict at least one likely time sequence of future states of the detected object (e.g., at least one likely future trajectory of the detected object), and (iii) output an indicator of the at least one likely time sequence of future states of the detected object. This type of data science model may be referred to herein as a "future-state model."

Such a future-state model will typically be created by an off-board computing system (e.g., a backend platform) and then loaded onto on-board computing system 702, although it is possible that a future-state model could be created by on-board computing system 702 itself. Either way, the future-state model may be created using any modeling technique now known or later developed, including but not limited to a machine-learning technique that may be used to iteratively "train" the data science model to predict a likely time sequence of future states of an object based on training data. The training data may comprise both test data (e.g., historical representations of surrounding environments at certain historical perception times) and associated ground-truth data (e.g., historical state data that indicates the actual states of objects in the surrounding environments during some window of time following the historical perception times).

Prediction subsystem 702b could predict the future state of a detected object in other manners as well. For instance, for detected objects that have been classified by perception subsystem 702a as belonging to certain classes of static objects (e.g., roads, curbs, lane markings, etc.), which generally do not have the potential to move, prediction subsystem 702b may rely on this classification as a basis for predicting that the future state of the detected object will remain the same at each of the one or more future times (in which case the state-prediction model may not be used for such detected objects). However, it should be understood that detected objects may be classified by perception subsystem 702a as belonging to other classes of static objects that have the potential to change state despite not having the potential to move, in which case prediction subsystem 702b may still use a future-state model to predict the future state of such detected objects. One example of a static object class that falls within this category is a traffic light, which generally does not have the potential to move but may nevertheless have the potential to change states (e.g., between green, yellow, and red) while being perceived by vehicle 700.

After predicting the future state of each object detected in the surrounding environment perceived by vehicle 700 at one or more future times, prediction subsystem 702b may then either incorporate this predicted state information into the previously-derived representation of the vehicle's surrounding environment (e.g., by adding data arrays to the data structure that represents the surrounding environment) or derive a separate representation of the vehicle's surrounding environment that incorporates the predicted state information for the detected objects, among other possibilities.

As shown, prediction subsystem 702b may pass the one or more derived representations of the vehicle's surrounding environment to planning subsystem 702c. In turn, planning subsystem 702c may be configured to use the one or more derived representations of the vehicle's surrounding environment (and perhaps other data) to derive a behavior plan for vehicle 700, which defines the desired driving behavior of vehicle 700 for some future period of time (e.g., the next 5 seconds).

The behavior plan that is derived for vehicle 700 may take various forms. For instance, as one possibility, the derived behavior plan for vehicle 700 may comprise a planned trajectory for vehicle 700 that specifies a planned state of vehicle 700 at each of one or more future times (e.g., each second over the next 5 seconds), where the planned state for each future time may include a planned position of vehicle 700 at the future time, a planned orientation of vehicle 700 at the future time, a planned velocity of vehicle 700 at the future time, and/or a planned acceleration of vehicle 700 (whether positive or negative) at the future time, among other possible types of state information. As another possibility, the derived behavior plan for vehicle 700 may comprise one or more planned actions that are to be performed by vehicle 700 during the future window of time, where each planned action is defined in terms of the type of action to be performed by vehicle 700 and a time and/or location at which vehicle 700 is to perform the action, among other possibilities. The derived behavior plan for vehicle 700 may define other planned aspects of the vehicle's behavior as well.

Further, in practice, planning subsystem 702c may derive the behavior plan for vehicle 700 in various manners. For instance, as one possibility, planning subsystem 702c may be configured to derive the behavior plan for vehicle 700 by (i) deriving a plurality of different "candidate" behavior plans for vehicle 700 based on the one or more derived representations of the vehicle's surrounding environment (and perhaps other data), (ii) evaluating the candidate behavior plans relative to one another (e.g., by scoring the candidate behavior plans using one or more cost functions) in order to identify which candidate behavior plan is most desirable when considering factors such as proximity to other objects, velocity, acceleration, time and/or distance to destination, road conditions, weather conditions, traffic conditions, and/or traffic laws, among other possibilities, and then (iii) selecting the candidate behavior plan identified as being most desirable as the behavior plan to use for vehicle 700. Planning subsystem 702c may derive the behavior plan for vehicle 700 in various other manners as well.

After deriving the behavior plan for vehicle 700, planning subsystem 702c may pass data indicating the derived behavior plan to control subsystem 702d. In turn, control subsystem 702d may be configured to transform the behavior plan for vehicle 700 into one or more control signals (e.g., a set of one or more command messages) for causing vehicle 700 to execute the behavior plan. For instance, based on the behavior plan for vehicle 700, control subsystem 702d may be configured to generate control signals for causing vehicle 700 to adjust its steering in a specified manner, accelerate in a specified manner, and/or brake in a specified manner, among other possibilities.

As shown, control subsystem 702d may then pass the one or more control signals for causing vehicle 700 to execute the behavior plan to vehicle-interface subsystem 702e. In turn, vehicle-interface subsystem 702e may be configured to translate the one or more control signals into a format that can be interpreted and executed by components of vehicle-control system 703. For example, vehicle-interface subsystem 702e may be configured to translate the one or more control signals into one or more control messages are defined according to a particular format or standard, such as a CAN bus standard and/or some other format or standard that is used by components of vehicle-control system 703.

In turn, vehicle-interface subsystem 702e may be configured to direct the one or more control signals to the appropriate control components of vehicle-control system 703. For instance, as shown, vehicle-control system 703 may include a plurality of actuators that are each configured to control a respective aspect of the vehicle's physical operation, such as a steering actuator 703a that is configured to control the vehicle components responsible for steering (not shown), an acceleration actuator 703b that is configured to control the vehicle components responsible for acceleration such as a throttle (not shown), and a braking actuator 703c that is configured to control the vehicle components responsible for braking (not shown), among other possibilities. In such an arrangement, vehicle-interface subsystem 702e of on-board computing system 702 may be configured to direct steering-related control signals to steering actuator 703a, acceleration-related control signals to acceleration actuator 703b, and braking-related control signals to braking actuator 703c. However, it should be understood that the control components of vehicle-control system 703 may take various other forms as well.

Notably, the subsystems of on-board computing system 702 may be configured to perform the above functions in a repeated manner, such as many times per second, which may enable vehicle 700 to continually update both its understanding of the surrounding environment and its planned behavior within that surrounding environment.

Although not specifically shown, it should be understood that vehicle 700 includes various other systems and components as well, including but not limited to a propulsion system that is responsible for creating the force that leads to the physical movement of vehicle 700.

Figure 8:
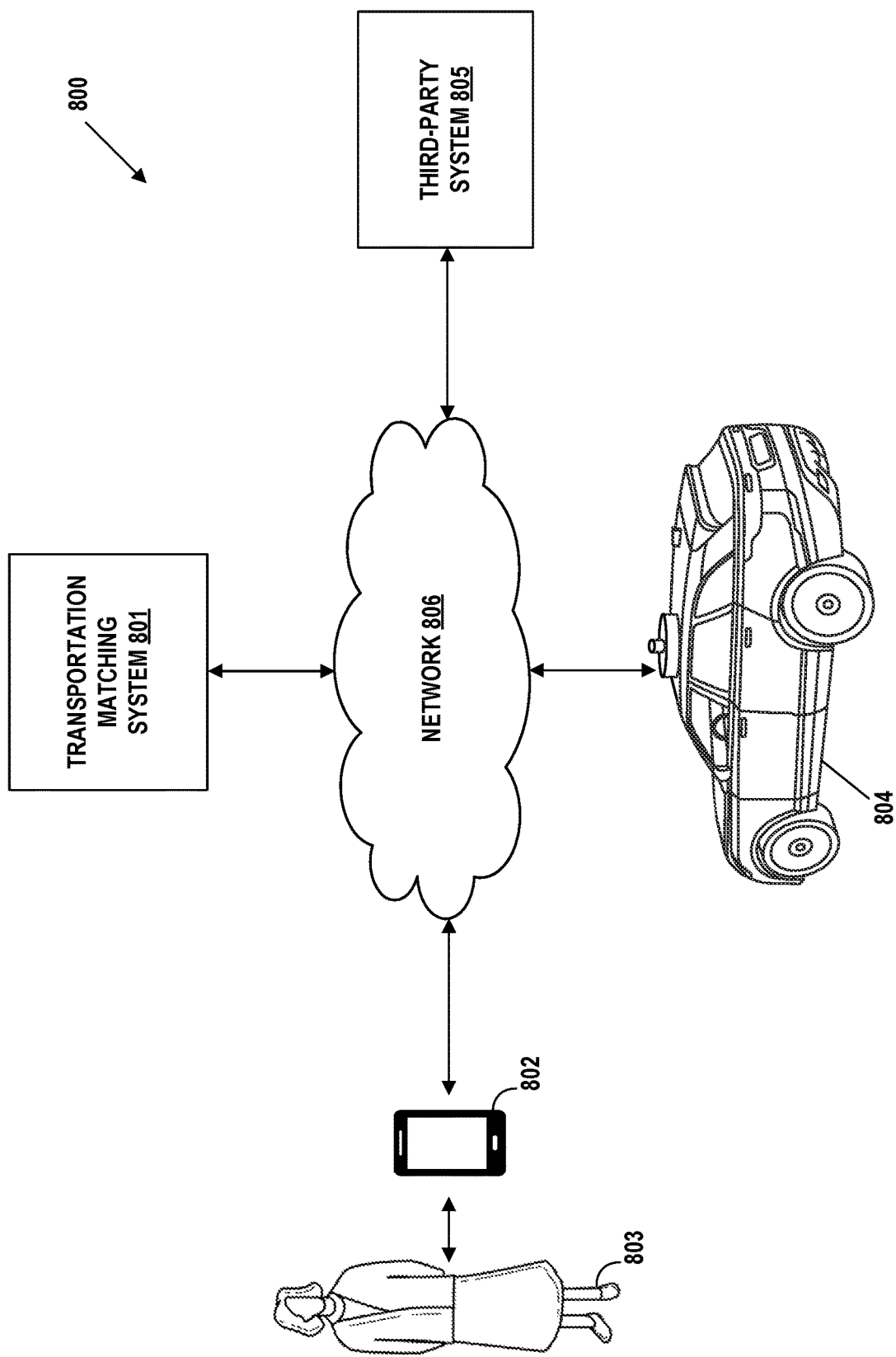
FIG. 8 a simplified block diagram that illustrates one example of a transportation-matching platform.

Turning now to FIG. 8, a simplified block diagram is provided to illustrate one example of a transportation-matching platform 800 that functions to match individuals interested in obtaining transportation from one location to another with transportation options, such as vehicles that are capable of providing the requested transportation. As shown, transportation-matching platform 800 may include at its core a transportation-matching system 801, which may be communicatively coupled via a communication network 806 to (i) a plurality of client stations of individuals interested in transportation (i.e., "transportation requestors"), of which client station 802 of transportation requestor 803 is shown as one representative example, (ii) a plurality of vehicles that are capable of providing the requested transportation, of which vehicle 804 is shown as one representative example, and (iii) a plurality of third-party systems that are capable of providing respective subservices that facilitate the platform's transportation matching, of which third-party system 805 is shown as one representative example.

Broadly speaking, transportation-matching system 801 may include one or more computing systems that collectively comprise a communication interface, at least one processor, data storage, and executable program instructions for carrying out functions related to managing and facilitating transportation matching. These one or more computing systems may take various forms and be arranged in various manners. For instance, as one possibility, transportation-matching system 801 may comprise computing infrastructure of a public, private, and/or hybrid cloud (e.g., computing and/or storage clusters). In this respect, the entity that owns and operates transportation-matching system 801 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, transportation-matching system 801 may comprise one or more dedicated servers. Other implementations of transportation-matching system 801 are possible as well.

As noted, transportation-matching system 801 may be configured to perform functions related to managing and facilitating transportation matching, which may take various forms. For instance, as one possibility, transportation-matching system 801 may be configured to receive transportation requests from client stations of transportation requestors (e.g., client station 802 of transportation requestor 803) and then fulfill such transportation requests by dispatching suitable vehicles, which may include vehicle 804. In this respect, a transportation request from client station 802 of transportation requestor 803 may include various types of information.

For example, a transportation request from client station 802 of transportation requestor 803 may include specified pick-up and drop-off locations for the transportation. As another example, a transportation request from client station 802 of transportation requestor 803 may include an identifier that identifies transportation requestor 803 in transportation-matching system 801, which may be used by transportation-matching system 801 to access information about transportation requestor 803 (e.g., profile information) that is stored in one or more data stores of transportation-matching system 801 (e.g., a relational database system), in accordance with the transportation requestor's privacy settings. This transportation requestor information may take various forms, examples of which include profile information about transportation requestor 803. As yet another example, a transportation request from client station 802 of transportation requestor 803 may include preferences information for transportation requestor 803, examples of which may include vehicle-operation preferences (e.g., safety comfort level, preferred speed, rates of acceleration or deceleration, safety distance from other vehicles when traveling at various speeds, route, etc.), entertainment preferences (e.g., preferred music genre or playlist, audio volume, display brightness, etc.), temperature preferences, and/or any other suitable information.

As another possibility, transportation-matching system 801 may be configured to access information related to a requested transportation, examples of which may include information about locations related to the transportation, traffic data, route options, optimal pick-up or drop-off locations for the transportation, and/or any other suitable information associated with requested transportation. As an example and not by way of limitation, when transportation-matching system 801 receives a request for transportation from San Francisco International Airport (SFO) to Palo Alto, California, system 801 may access or generate any relevant information for this particular transportation request, which may include preferred pick-up locations at SFO, alternate pick-up locations in the event that a pick-up location is incompatible with the transportation requestor (e.g., the transportation requestor may be disabled and cannot access the pick-up location) or the pick-up location is otherwise unavailable due to construction, traffic congestion, changes in pick-up/drop-off rules, or any other reason, one or more routes to travel from SFO to Palo Alto, preferred off-ramps for a type of transportation requestor, and/or any other suitable information associated with the transportation.

In some embodiments, portions of the accessed information could also be based on historical data associated with historical transportation facilitated by transportation-matching system 801. For example, historical data may include aggregate information generated based on past transportation information, which may include any information described herein and/or other data collected by sensors affixed to or otherwise located within vehicles (including sensors of other computing devices that are located in the vehicles such as client stations). Such historical data may be associated with a particular transportation requestor (e.g., the particular transportation requestor's preferences, common routes, etc.), a category/class of transportation requestors (e.g., based on demographics), and/or all transportation requestors of transportation-matching system 801.

For example, historical data specific to a single transportation requestor may include information about past rides that a particular transportation requestor has taken, including the locations at which the transportation requestor is picked up and dropped off, music the transportation requestor likes to listen to, traffic information associated with the rides, time of day the transportation requestor most often rides, and any other suitable information specific to the transportation requestor. As another example, historical data associated with a category/class of transportation requestors may include common or popular ride preferences of transportation requestors in that category/class, such as teenagers preferring pop music, transportation requestors who frequently commute to the financial district may prefer to listen to the news, etc. As yet another example, historical data associated with all transportation requestors may include general usage trends, such as traffic and ride patterns.

Using such historical data, transportation-matching system 801 could be configured to predict and provide transportation suggestions in response to a transportation request. For instance, transportation-matching system 801 may be configured to apply one or more machine-learning techniques to such historical data in order to "train" a machine-learning model to predict transportation suggestions for a transportation request. In this respect, the one or more machine-learning techniques used to train such a machine-learning model may take any of various forms, examples of which may include a regression technique, a neural-network technique, a k-Nearest Neighbor (kNN) technique, a decision-tree technique, a support-vector-machines (SVM) technique, a Bayesian technique, an ensemble technique, a clustering technique, an association-rule-learning technique, and/or a dimensionality-reduction technique, among other possibilities.

In operation, transportation-matching system 801 may only be capable of storing and later accessing historical data for a given transportation requestor if the given transportation requestor previously decided to "opt-in" to having such information stored. In this respect, transportation-matching system 801 may maintain respective privacy settings for each transportation requestor that uses transportation-matching platform 800 and operate in accordance with these settings. For instance, if a given transportation requestor did not opt-in to having his or her information stored, then transportation-matching system 801 may forgo performing any of the above-mentioned functions based on historical data. Other possibilities also exist.

Transportation-matching system 801 may be configured to perform various other functions related to managing and facilitating transportation matching as well.

Referring again to FIG. 8, client station 802 of transportation requestor 803 may generally comprise any computing device that is configured to facilitate interaction between transportation requestor 803 and transportation-matching system 801. For instance, client station 802 may take the form of a smartphone, a tablet, a desktop computer, a laptop, a netbook, and/or a PDA, among other possibilities. Each such device may comprise an I/O interface, a communication interface, a GNSS unit such as a GPS unit, at least one processor, data storage, and executable program instructions for facilitating interaction between transportation requestor 803 and transportation-matching system 801 (which may be embodied in the form of a software application, such as a mobile application, web application, or the like). In this respect, the interaction that may take place between transportation requestor 803 and transportation-matching system 801 may take various forms, representative examples of which may include requests by transportation requestor 803 for new transportation events, confirmations by transportation-matching system 801 that transportation requestor 803 has been matched with a vehicle (e.g., vehicle 804), and updates by transportation-matching system 801 regarding the progress of the transportation event, among other possibilities.

In turn, vehicle 804 may generally comprise any kind of vehicle that can provide transportation, and in one example, may take the form of vehicle 700 described above. Further, the functionality carried out by vehicle 804 as part of transportation-matching platform 800 may take various forms, representative examples of which may include receiving a request from transportation-matching system 801 to handle a new transportation event, driving to a specified pickup location for a transportation event, driving from a specified pickup location to a specified drop-off location for a transportation event, and providing updates regarding the progress of a transportation event to transportation-matching system 801, among other possibilities.

Generally speaking, third-party system 805 may include one or more computing systems that collectively comprise a communication interface, at least one processor, data storage, and executable program instructions for carrying out functions related to a third-party subservice that facilitates the platform's transportation matching. These one or more computing systems may take various forms and may be arranged in various manners, such as any one of the forms and/or arrangements discussed above with reference to transportation-matching system 801.

Moreover, third-party system 805 may be configured to perform functions related to various subservices. For instance, as one possibility, third-party system 805 may be configured to monitor traffic conditions and provide traffic data to transportation-matching system 801 and/or vehicle 804, which may be used for a variety of purposes. For example, transportation-matching system 801 may use such data to facilitate fulfilling transportation requests in the first instance and/or updating the progress of initiated transportation events, and vehicle 804 may use such data to facilitate updating certain predictions regarding perceived agents and/or the vehicle's behavior plan, among other possibilities.

As another possibility, third-party system 805 may be configured to monitor weather conditions and provide weather data to transportation-matching system 801 and/or vehicle 804, which may be used for a variety of purposes. For example, transportation-matching system 801 may use such data to facilitate fulfilling transportation requests in the first instance and/or updating the progress of initiated transportation events, and vehicle 804 may use such data to facilitate updating certain predictions regarding perceived agents and/or the collection vehicle's behavior plan, among other possibilities.

As yet another possibility, third-party system 805 may be configured to authorize and process electronic payments for transportation requests. For example, after transportation requestor 803 submits a request for a new transportation event via client station 802, third-party system 805 may be configured to confirm that an electronic payment method for transportation requestor 803 is valid and authorized and then inform transportation-matching system 801 of this confirmation, which may cause transportation-matching system 801 to dispatch vehicle 804 to pick up transportation requestor 803. After receiving a notification that the transportation event is complete, third-party system 805 may then charge the authorized electronic payment method for transportation requestor 803 according to the fare for the transportation event. Other possibilities also exist.

Third-party system 805 may be configured to perform various other functions related to sub services that facilitate the platform's transportation matching as well. It should be understood that, although certain functions were discussed as being performed by third-party system 805, some or all of these functions may instead be performed by transportation-matching system 801.

As discussed above, transportation-matching system 801 may be communicatively coupled to client station 802, vehicle 804, and third-party system 805 via communication network 806, which may take various forms. For instance, at a high level, communication network 806 may include one or more Wide-Area Networks (WANs) (e.g., the Internet or a cellular network), Local-Area Networks (LANs), and/or Personal Area Networks (PANs), among other possibilities, where each such network may be wired and/or wireless and may carry data according to any of various different communication protocols. Further, it should be understood that the respective communication paths between the various entities of FIG. 8 may take other forms as well, including the possibility that such communication paths include communication links and/or intermediate devices that are not shown.

In the foregoing arrangement, client station 802, vehicle 804, and/or third-party system 805 may also be capable of indirectly communicating with one another via transportation-matching system 801. Additionally, although not shown, it is possible that client station 802, vehicle 804, and/or third-party system 805 may be configured to communicate directly with one another as well (e.g., via a short-range wireless communication path or the like). Further, vehicle 804 may also include a user-interface system that may facilitate direct interaction between transportation requestor 803 and vehicle 804 once transportation requestor 803 enters vehicle 804 and the transportation event begins.

It should be understood that transportation-matching platform 800 may include various other entities and take various other forms as well.

Figure 9:
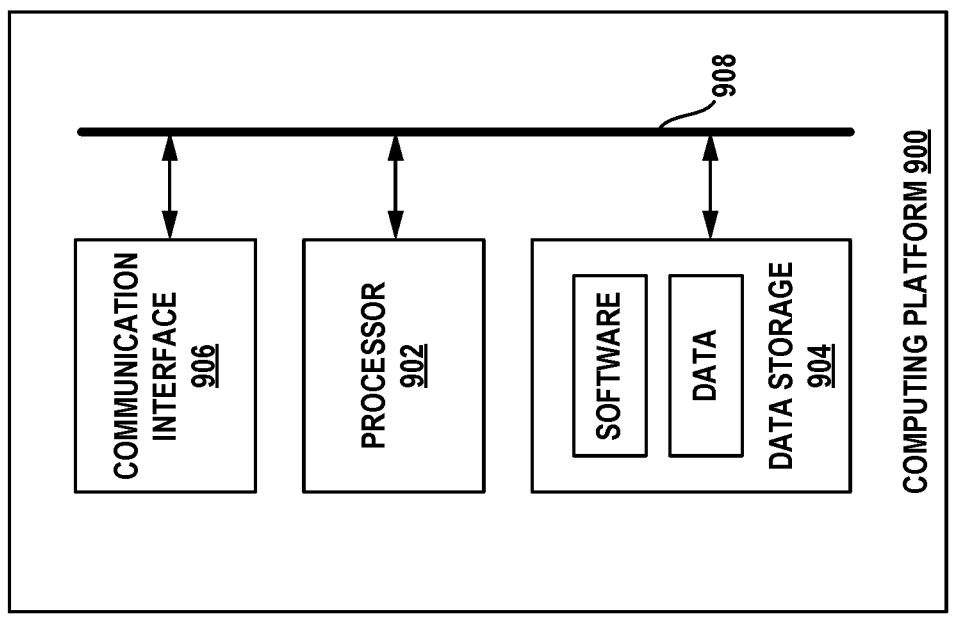
FIG. 9 is a simplified block diagram that illustrates some structural components that may be included in an example computing platform.

Turning now to FIG. 9, a simplified block diagram is provided to illustrate some structural components that may be included in an example computing platform 900, which may be configured to carry out the any of various functions disclosed herein—including but not limited to the functions included in the examples described with reference to FIGS. 3A-3C, 4A-4C, and 5A-5C. At a high level, computing platform 900 may generally comprise any one or more computer systems (e.g., one or more servers) that collectively include at least a processor 902, data storage 904, and a communication interface 906, all of which may be communicatively linked by a communication link 908 that may take the form of a system bus, a communication network such as a public, private, or hybrid cloud, or some other connection mechanism. Each of these components may take various forms.

For instance, processor 902 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 902 could comprise processing components that are distributed across a plurality of physical computing devices connected via a network, such as a computing cluster of a public, private, or hybrid cloud.

In turn, data storage 904 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 904 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 9, data storage 904 may be capable of storing both (i) program instructions that are executable by processor 902 such that the computing platform 900 is configured to perform any of the various functions disclosed herein (including but not limited to any the functions described with reference to FIGS. 3A-3C, 4A-4C, and 5A-5C), and (ii) data that may be received, derived, or otherwise stored by computing platform 900.

Communication interface 906 may take the form of any one or more interfaces that facilitate communication between computing platform 900 and other systems or devices. In this respect, each such interface may be wired and/or wireless and may communicate according to any of various communication protocols, examples of which may include Ethernet, Wi-Fi, Controller Area Network (CAN) bus, serial bus (e.g., Universal Serial Bus (USB) or Firewire), cellular network, and/or short-range wireless protocols, among other possibilities.

Although not shown, computing platform 900 may additionally include one or more input/output (I/O) interfaces that are configured to either (i) receive and/or capture information at computing platform 900 and (ii) output information to a client station (e.g., for presentation to a user). In this respect, the one or more I/O interfaces may include or provide connectivity to input components such as a microphone, a camera, a keyboard, a mouse, a trackpad, a touchscreen, and/or a stylus, among other possibilities, as well as output components such as a display screen and/or an audio speaker, among other possibilities.

It should be understood that computing platform 900 is one example of a computing platform that may be used with the embodiments described herein. Numerous other arrangements are possible and contemplated herein. For instance, other computing platforms may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computer-implemented method comprising:
obtaining first image data captured by a first camera of a vehicle during a given period of operation of the vehicle;
obtaining second image data captured by a second camera of the vehicle during the given period of operation of the vehicle; and
applying optimization to determine a combination of an extrinsics transformation and a time offset that jointly minimizes an aggregated reprojection error determined based on the first and second image data, wherein the optimization involves iteratively:
determining a combination of a respective candidate extrinsics transformation and a respective candidate time offset for which to determine an aggregated reprojection error;
determining a respective reprojection error for each respective first image in a given set of first images from the first image data by (i) identifying a corresponding pair of second images from the second image data that bound the respective first image, (ii) determining a candidate pose for the first camera based on the respective candidate extrinsics transformation, the respective candidate time offset, and estimated poses of the second camera associated with the corresponding pair of second images, and (iii) determining the respective reprojection error for the respective first image based on at least one landmark that is reprojected from at least one of the corresponding pair of second images into the respective first image using the candidate pose for the first camera; and
based on the respective reprojection errors that are determined for the respective first images in the given set of first images, determining the aggregated reprojection error produced by the combination of the respective candidate extrinsics transformation and the respective time offset;
wherein the determined combination of the extrinsics transformation and the time offset is utilized to calibrate a first sensor system comprising the first camera with a second sensor system comprising the second camera.

2. The computer-implemented method of claim 1, wherein the first sensor system comprises a LiDAR-based sensor system and the second sensor system comprises a camera-based sensor system.

3. The computer-implemented method of claim 1, wherein:
each image in the first image data has an associated timestamp represented according to a first clock; and
each image in the second image data has an associated timestamp represented according to a second clock that differs from the first clock.

4. The computer-implemented method of claim 1, wherein, during an initial iteration of the optimization, determining the respective candidate extrinsics transformation comprises:
comparing respective poses of the first and second cameras in relation to a common landmark.

5. The computer-implemented method of claim 1, wherein, during an initial iteration of the optimization, determining the respective candidate time offset comprises:
determining the respective candidate time offset using the respective candidate extrinsics transformation.

6. The computer-implemented method of claim 1, wherein determining the candidate pose for the first camera based on the respective candidate extrinsics transformation, the respective candidate time offset, and the estimated poses of the second camera associated with the corresponding pair of second images comprises:
determining the estimated poses of the second camera associated with the corresponding pair of second images;

using the respective candidate time offset to determine an intermediate pose between the estimated poses of the second camera associated with the corresponding pair of second images; and applying the respective candidate extrinsics transformation to the intermediate pose.

7. The computer-implemented method of claim 6, using the respective candidate time offset to determine the intermediate pose between the estimated poses of the second camera associated with the corresponding pair of second images comprises:

assuming linear motion of the second camera between the estimated poses.

8. The computer-implemented method of claim 1, wherein the candidate extrinsics transformation is fixed between iterations of the optimization.

9. A non-transitory computer-readable medium comprising program instructions stored thereon that are executable to cause a computing system to:

obtain first image data captured by a first camera of a vehicle during a given period of operation of the vehicle;

obtain second image data captured by a second camera of the vehicle during the given period of operation of the vehicle; and apply optimization to determine a combination of an extrinsics transformation and a time offset that jointly minimizes an aggregated reprojection error determined based on the first and second image data, wherein the optimization involves iteratively:

determining a combination of a respective candidate extrinsics transformation and a respective candidate time offset for which to determine an aggregated reprojection error;

determining a respective reprojection error for each respective first image in a given set of first images from the first image data by (i) identifying a corresponding pair of second images from the second image data that bound the respective first image, (ii) determining a candidate pose for the first camera based on the respective candidate extrinsics transformation, the respective candidate time offset, and estimated poses of the second camera associated with the corresponding pair of second images, and (iii) determining the respective reprojection error for the respective first image based on at least one landmark that is reprojected from at least one of the corresponding pair of second images into the respective first image using the candidate pose for the first camera; and based on the respective reprojection errors that are determined for the respective first images in the given set of first images, determining the aggregated reprojection error produced by the combination of the respective candidate extrinsics transformation and the respective time offset;

wherein the determined combination of the extrinsics transformation and the time offset is utilized to calibrate a first sensor system comprising the first camera with a second sensor system comprising the second camera.

10. The computer-readable medium of claim 9, wherein the first sensor system comprises a LiDAR-based sensor system and the second sensor system comprises a camera-based sensor system.

11. The computer-readable medium of claim 9, wherein:

each image in the first image data has an associated timestamp represented according to a first clock; and each image in the second image data has an associated timestamp represented according to a second clock that differs from the first clock.

12. The computer-readable medium of claim 9, wherein, during an initial iteration of the optimization, determining the respective candidate extrinsics transformation comprises:

comparing respective poses of the first and second cameras in relation to a common landmark.

13. The computer-readable medium of claim 9, wherein, during an initial iteration of the optimization, determining the respective candidate time offset comprises:

determining the respective candidate time offset using the respective candidate extrinsics transformation.

14. The computer-readable medium of claim 9, wherein determining the candidate pose for the first camera based on the respective candidate extrinsics transformation, the respective candidate time offset, and the estimated poses of the second camera associated with the corresponding pair of second images comprises:

determining the estimated poses of the second camera associated with the corresponding pair of second images;

using the respective candidate time offset to determine an intermediate pose between the estimated poses of the second camera associated with the corresponding pair of second images; and applying the respective candidate extrinsics transformation to the intermediate pose.

15. The computer-readable medium of claim 14, wherein using the respective candidate time offset to determine the intermediate pose between the estimated poses of the second camera associated with the corresponding pair of second images comprises:

assuming linear motion of the second camera between the estimated poses.

16. The computer-readable medium of claim 9, wherein the candidate extrinsics transformation is fixed between iterations of the optimization.

17. A computing system comprising:

at least one processor;

at least one non-transitory computer-readable medium; and program instructions stored on the at least one non-transitory computer-readable medium that are executable by the at least one processor such that the computing system is capable of:

obtaining first image data captured by a first camera of a vehicle during a given period of operation of the vehicle;

obtaining second image data captured by a second camera of the vehicle during the given period of operation of the vehicle; and applying optimization to determine a combination of an extrinsics transformation and a time offset that jointly minimizes an aggregated reprojection error determined based on the first and second image data, wherein the optimization involves iteratively:

determining a combination of a respective candidate extrinsics transformation and a respective candidate time offset for which to determine an aggregated reprojection error;

determining a respective reprojection error for each respective first image in a given set of first images from the first image data by (i) identifying a corresponding pair of second images from the second image data that bound the respective first image, (ii) determining a candidate pose for the first camera based on the respective candidate extrinsics transformation, the respective candidate time offset, and estimated poses of the second camera associated with the corresponding pair of second images, and (iii) determining the respective reprojection error for the respective first image based on at least one landmark that is reprojected from at least one of the corresponding pair of second images into the respective first image using the candidate pose for the first camera; and based on the respective reprojection errors that are determined for the respective first images in the given set of first images, determining the aggregated reprojection error produced by the combination of the respective candidate extrinsics transformation and the respective time offset;

wherein the determined combination of the extrinsics transformation and the time offset is utilized to calibrate a first sensor system comprising the first camera with a second sensor system comprising the second camera.

18. The computing system of claim 17, wherein the first sensor system comprises a LiDAR-based sensor system and the second sensor system comprises a camera-based sensor system.

19. The computing system of claim 17, wherein determining the candidate pose for the first camera based on the respective candidate extrinsics transformation, the respective candidate time offset, and the estimated poses of the second camera associated with the corresponding pair of second images comprises:

determining the estimated poses of the second camera associated with the corresponding pair of second images;

using the respective candidate time offset to determine an intermediate pose between the estimated poses of the second camera associated with the corresponding pair of second images; and applying the respective candidate extrinsics transformation to the intermediate pose.

20. The computing system of claim 19, wherein using the respective candidate time offset to determine the intermediate pose between the estimated poses of the second camera associated with the corresponding pair of second images comprises:

assuming linear motion of the second camera between the estimated poses.

* * * * *